United States Patent
Stubbs

(10) Patent No.: US 12,535,074 B2
(45) Date of Patent: *Jan. 27, 2026

(54) COMPUTER-CONTROLLED POWER TAKEOFF DRIVEN MOTORIZED PUMP SYSTEM

(71) Applicant: Lovis, LLC, Wilmington, DE (US)

(72) Inventor: Rustee Stubbs, Washington, UT (US)

(73) Assignee: Lovis, LLC, Wilmington, DE (US)

( * ) Notice: Subject to any disclaimer, the term of this patent is extended or adjusted under 35 U.S.C. 154(b) by 277 days.

This patent is subject to a terminal disclaimer.

(21) Appl. No.: 18/337,261

(22) Filed: Jun. 19, 2023

(65) Prior Publication Data

US 2023/0332606 A1    Oct. 19, 2023

Related U.S. Application Data

(63) Continuation-in-part of application No. 17/306,467, filed on May 3, 2021, now Pat. No. 11,680,570,
(Continued)

(51) Int. Cl.
*F04D 15/00* (2006.01)
*B60P 3/22* (2006.01)
(Continued)

(52) U.S. Cl.
CPC ............ *F04D 15/00* (2013.01); *B60P 3/2245* (2013.01); *B60P 3/225* (2013.01); *F04D 13/06* (2013.01);
(Continued)

(58) Field of Classification Search
None
See application file for complete search history.

(56) References Cited

U.S. PATENT DOCUMENTS 6,152,059 A * 11/2000 Del Raso ............. B63B 25/082
  114/227
6,223,546 B1 * 5/2001 Chopko ................... B60P 3/20
  62/297

(Continued)

FOREIGN PATENT DOCUMENTS

DE   102012005299 A1    9/2013
EP       0056344 A1 *   7/1982   ............. B60P 3/228
(Continued)

OTHER PUBLICATIONS

Machine Translation of Chinese Patent Application CN 105813874 B, 2019. (Year: 2019).*

(Continued)

*Primary Examiner* — Steven G Snyder
(74) *Attorney, Agent, or Firm* — Gurr & Brande, PLLC; Robert A. Gurr

(57) ABSTRACT

A computer-controlled motorized pump system is provided. A generator is mechanically connected to a power takeoff. A first controller receives AC power from the generator and converts the AC power to DC power and provides DC power to a computing system that has one or more processors and one or more computer-readable hardware storage media and a user interface. A second controller is directly coupled to the first controller and provides AC power to a motor. The motor is mechanically connected to a pump, and the motor is in communication with, or controlled by, the computing system.

18 Claims, 18 Drawing Sheets

Related U.S. Application Data which is a continuation of application No. 17/086,692, filed on Nov. 2, 2020, now Pat. No. 10,995,760.

(60) Provisional application No. 62/928,716, filed on Oct. 31, 2019.

(51) Int. Cl.
| | |
|---|---|
| *F04D 13/06* | (2006.01) |
| *F04D 13/16* | (2006.01) |
| *G05B 19/042* | (2006.01) |
| *G06F 1/26* | (2006.01) |
| *H04Q 9/00* | (2006.01) |

(52) U.S. Cl.
CPC .......... *F04D 13/16* (2013.01); *G05B 19/042* (2013.01); *G06F 1/263* (2013.01); *H04Q 9/00* (2013.01); *G05B 2219/2639* (2013.01); *H04Q 2209/40* (2013.01)

(56) References Cited

U.S. PATENT DOCUMENTS

| | | | | |
|---|---|---|---|---|
| 6,612,591 B1* | 9/2003 | Watanabe | ............... | F02B 63/04 280/4 |
| 6,624,533 B1* | 9/2003 | Swanson | ................. | H02P 9/307 307/64 |
| 6,742,343 B2* | 6/2004 | Matonog | .............. | B60H 1/3232 62/298 |
| 6,889,728 B2* | 5/2005 | Kamikozuru | ............. | F17C 5/02 141/59 |
| 7,231,959 B2* | 6/2007 | Larson | ................ | F02B 29/0431 165/41 |
| 7,240,812 B2* | 7/2007 | Kamikozuru | ........... | F17C 5/007 222/627 |
| 7,290,592 B2* | 11/2007 | Larson | ................ | F02B 29/0431 165/41 |
| 7,458,417 B2* | 12/2008 | Larson | ...................... | F01P 3/20 123/41.01 |
| 7,584,722 B2* | 9/2009 | Sobotzik | ................. | F01P 7/048 123/41.11 |
| 7,921,659 B2* | 4/2011 | Quesada Saborio | ... | F25D 19/00 62/298 |
| 8,096,107 B2* | 1/2012 | Larson | ................... | F01P 7/08 60/275 |
| 8,408,341 B2* | 4/2013 | Dalum | ...................... | B60L 1/00 180/65.285 |
| 8,776,928 B2* | 7/2014 | Stover, Jr. | .......... | B60H 1/00428 180/165 |
| 8,905,166 B2* | 12/2014 | Dalum | ................... | B60W 20/20 180/65.285 |
| 8,978,798 B2* | 3/2015 | Dalum | .................... | B60L 1/003 180/65.22 |
| 9,061,680 B2* | 6/2015 | Dalum | ................... | B60K 25/02 |
| 9,389,007 B1* | 7/2016 | McKay | .................. | F25B 47/025 |
| 9,586,458 B2* | 3/2017 | Larson | .............. | B60H 1/00428 |
| 9,641,047 B2* | 5/2017 | Collett | ................ | H02K 7/1807 |
| 9,643,593 B2* | 5/2017 | Dalum | ............. | B60W 30/1888 |
| 9,751,518 B2* | 9/2017 | Dalum | .................... | B60L 1/00 |
| 9,878,616 B2* | 1/2018 | Dalum | ................... | B60K 25/00 |
| 10,214,199 B2* | 2/2019 | Dalum | ................... | B60K 17/28 |
| 10,240,847 B1* | 3/2019 | Thomas, Jr. | ......... | F25D 11/003 |
| 10,252,632 B2* | 4/2019 | Hernandez Lopez | .. | B60L 53/80 |
| 10,428,844 B1* | 10/2019 | Holt | .......................... | B60P 3/20 |
| 10,792,993 B2* | 10/2020 | Dalum | .................... | B60K 6/42 |
| 10,940,832 B1* | 3/2021 | Hardenia | ................ | B60R 25/32 |
| 11,613,458 B2* | 3/2023 | Grose | ................... | B60P 3/2265 141/1 |
| 2001/0020554 A1* | 9/2001 | Yanase | ..................... | B60K 6/46 180/65.245 |
| 2003/0205360 A1* | 11/2003 | Larson | ................ | F02B 29/0431 165/42 |
| 2006/0001318 A1* | 1/2006 | Ahmad | ................... | H02P 25/22 307/10.1 |
| 2006/0137923 A1* | 6/2006 | Larson | ..................... | F01P 3/20 180/65.28 |
| 2006/0137924 A1* | 6/2006 | Larson | ................ | F02B 29/0431 180/65.285 |
| 2006/0260304 A1* | 11/2006 | Ishiwatari | ............... | F02D 23/00 60/599 |
| 2007/0052241 A1* | 3/2007 | Pacy | .................. | B60H 1/00014 290/40 C |
| 2008/0121195 A1* | 5/2008 | Sobotzik | ................ | F02B 67/08 165/41 |
| 2008/0179130 A1* | 7/2008 | Larson | ................ | F02B 29/0431 180/309 |
| 2009/0095549 A1* | 4/2009 | Dalum | ..................... | B60L 1/00 180/65.265 |
| 2009/0260836 A1* | 10/2009 | Laskaris | ................. | F04D 9/001 169/14 |
| 2010/0219007 A1* | 9/2010 | Dalum | .................. | B60W 10/18 180/65.285 |
| 2010/0313849 A1* | 12/2010 | Stoner | ................... | B60W 10/02 417/1 |
| 2011/0279070 A1* | 11/2011 | Tanaka | .................... | H02P 6/188 318/400.1 |
| 2012/0035815 A1* | 2/2012 | Kawashima | .......... | B60W 10/30 903/902 |
| 2012/0207620 A1* | 8/2012 | Dalum | .................. | B60W 20/40 903/903 |
| 2014/0150871 A1* | 6/2014 | Goodier | ................ | B60P 3/2245 137/334 |
| 2014/0171260 A1* | 6/2014 | Dalum | .................. | B60W 10/06 903/906 |
| 2014/0225374 A1* | 8/2014 | Collett | ................ | H02K 7/1807 290/40 R |
| 2016/0096412 A1* | 4/2016 | Mankame | .......... | B60H 1/00978 165/203 |
| 2016/0320107 A1* | 11/2016 | McKay | ................ | H02K 7/1846 |
| 2017/0184090 A1* | 6/2017 | Hetcher | ................. | F04B 3/003 |
| 2017/0217280 A1* | 8/2017 | Larson | .............. | B60H 1/00764 |
| 2018/0281597 A1* | 10/2018 | Herb | .................... | B60L 3/0084 |
| 2018/0345805 A1* | 12/2018 | Hernandez Lopez | ... | B60K 1/00 |
| 2020/0086744 A1* | 3/2020 | Schumacher | ........... | B60L 58/22 |
| 2020/0172050 A1* | 6/2020 | Schwarz | ................ | B60R 25/33 |

FOREIGN PATENT DOCUMENTS

| | | |
|---|---|---|
| JP | 2009214599 A | 9/2009 |
| JP | 2018177106 A | 11/2018 |

OTHER PUBLICATIONS

Machine Translation of French Patent Application FR 2463298 A1, 1981. (Year: 1981).*

Machine Translation of Chinese Patent Application CN 105822566 A, 2016. (Year: 2016).*

Machine Translation of Japanese Patent Application JP 7169710 B1, 2022. (Year: 2022).*

* cited by examiner

COMPUTER-CONTROLLED POWER TAKEOFF DRIVEN MOTORIZED PUMP SYSTEM

CROSS-REFERENCE TO RELATED APPLICATIONS

This application is a continuation-in-part of U.S. patent application Ser. No. 17/306,467, filed on May 3, 2021, which is a continuation of U.S. patent application Ser. No. 17/086,692, filed on Nov. 2, 2020, which claimed the benefit of U.S. Provisional Application Ser. No. 62/928,716, filed on Oct. 31, 2019, all of which are incorporated herein by reference.

TECHNICAL FIELD

The present disclosure relates to a power takeoff pump system. More particularly, the present disclosure relates to a power takeoff pump system for tanker trucks that is controlled through one or more computing systems.

BACKGROUND

Freight companies commonly use semi-trailer trucks (more commonly referred to as "semi-trucks" or simply "semis") to transport freight. Often, semi-trucks transport freight in liquid form, pulling one or more tank trailers. Conventionally, pump systems for loading and/or unloading tank trailers are implemented into semi-trucks used for transporting tank trailers. Implementing the pumps onto the semi-trucks obviates the need for having on-site pump systems in diverse pick-up and delivery locations.

A semi-truck pump system is typically driven by a power takeoff (PTO) that is mechanically connected to the semi-truck's transmission to selectively transfer power from the semi-truck's running engine to the pump system. Conventional semi-truck pump systems, however, suffer from numerous shortcomings.

In a "wet kit" system, the PTO drives a hydraulic pump that connects to a hydraulic motor for driving a vacuum pump. Wet kit systems are prone to hydraulic leaks, necessitating excessive diagnostics and repairs. Additionally, hydraulic lines in wet kit systems are known to rupture when exposed to extreme and/or quickly changing temperatures. Freight companies often spend $500 to $1,000 per year in hydraulic motor, pump, and/or hose replacements for each wet kit in their fleet. Furthermore, when a hydraulic line ruptures, a minimum of 5 gallons of fluid spills, which further causes freight companies to incur cleanup expense in addition to repair/replacement expenses.

Additionally, the performance of the hydraulic pumps and hydraulic motors of wet kit systems is typically affected by the temperature in which the system runs, which can cause the vacuum pump and/or the motor thereof to fail. Wet kits require large cooling systems that can only be placed on the catwalk between the cab and the fifth wheel plate of the semi-truck. This arrangement may require that the vacuum pump be suspended over a side of the catwalk, which exposes the vacuum pump to debris impacts that cause additional vacuum pump damage.

Wet kits typically have only a 1,000-hour to 2,000-hour service life by reason of their complexity, user error, and deficiencies in the design. Wet kits can cost freight companies $4,000 or more per year in vacuum pump damages and $10,000 or more per year in downtime losses (per wet kit system in the fleet).

An alternative to a wet kit system is a direct drive system. In a direct drive system, the PTO is attached by a U joint to a driveline that is supported by a carrier bearing. An opposing end of the driveline connects, via another U joint, to a gear box that is mechanically connected to the vacuum pump for driving the vacuum pump.

Direct drive systems also suffer from a number of shortcomings. For instance, users are often injured by the long, rotating driveline, and the driveline is susceptible to damage (which in turn may damage the U joints, carrier bearing, gear box, and/or vacuum pump). Further, whenever the PTO is engaged, the vacuum pump runs. As a result, if a user fails to disengage the PTO before driving the truck, the excessive torque exerted on the vacuum pump can lead to its destruction. Additionally, direct drive systems typically have a service life of only 3,000 to 4,000 hours and cause $4,000 or more in vacuum pump damages and $6,000 or more per year in downtime losses (per direct drive system in the fleet).

The complexity of wet kit and direct drive systems makes them prone to user error. Proper operation of a wet kit or direct drive system requires careful control and monitoring, and fatigued and/or negligent truck drivers often fail to exercise due care. For instance, truck drivers often allow the hydraulic pump of a wet kit to run for excessive time periods, causing the vacuum pump to overheat. Additionally, truck drivers often fail to monitor the temperature of pump systems and start vacuum pumps while the pumps have frozen water in them, causing damage to the vacuum pumps. Furthermore, truck drivers often fail to adequately monitor pumping operations, which can cause spills that are costly for freight companies to remedy.

Accordingly, there are number of disadvantages with semi-truck pump systems that can be addressed.

The subject matter claimed herein is not limited to embodiments that solve any disadvantages or that operate only in environments such as those described above. Rather, this background is only provided to illustrate one exemplar technology area where some embodiments described herein may be practiced.

SUMMARY OF EXAMPLE EMBODIMENTS

In one embodiment, implementations of the present disclosure solve one or more of the foregoing or other problems in the art with semi-truck pump systems. In particular, one or more implementations can include a generator that is mechanically connected to a power takeoff (PTO), a first controller that receives AC power from the generator and converts the AC power to DC power to provide DC power to a computing system that has one or more processors and one or more computer-readable hardware storage media and a user interface, a second controller directly coupled to the first controller and providing AC power to a motor that is mechanically connected to a pump (e.g., a vacuum pump or a gear pump) and in communication with the computing system.

In some implementations, the computing system is in communication with one or more sensors connected to various portions of the computer-controlled motorized pump system. In some instances, the computing system is operable to execute instructions for providing notifications or deactivating the motor in response to triggering events, such as detecting that a sensor reading of the one or more sensors has met or exceeded a predetermined threshold value. The computing system may be in communication with one or more administrative computing systems.

In some embodiments, one or more auxiliary batteries (or other energy storage elements) may provide power to the climate control system of the semi-truck, allowing the climate control to function independent of the semi-truck engine or crank battery.

Additionally, in some embodiments, power from the auxiliary batteries may be directed to the drivetrain of the semi-truck, thereby increasing fuel efficiency during transport.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

The disclosure will be described and explained with additional specificity and detail through the use of the accompanying drawings in which.

DETAILED DESCRIPTION OF EXAMPLE EMBODIMENTS

Figure 1:
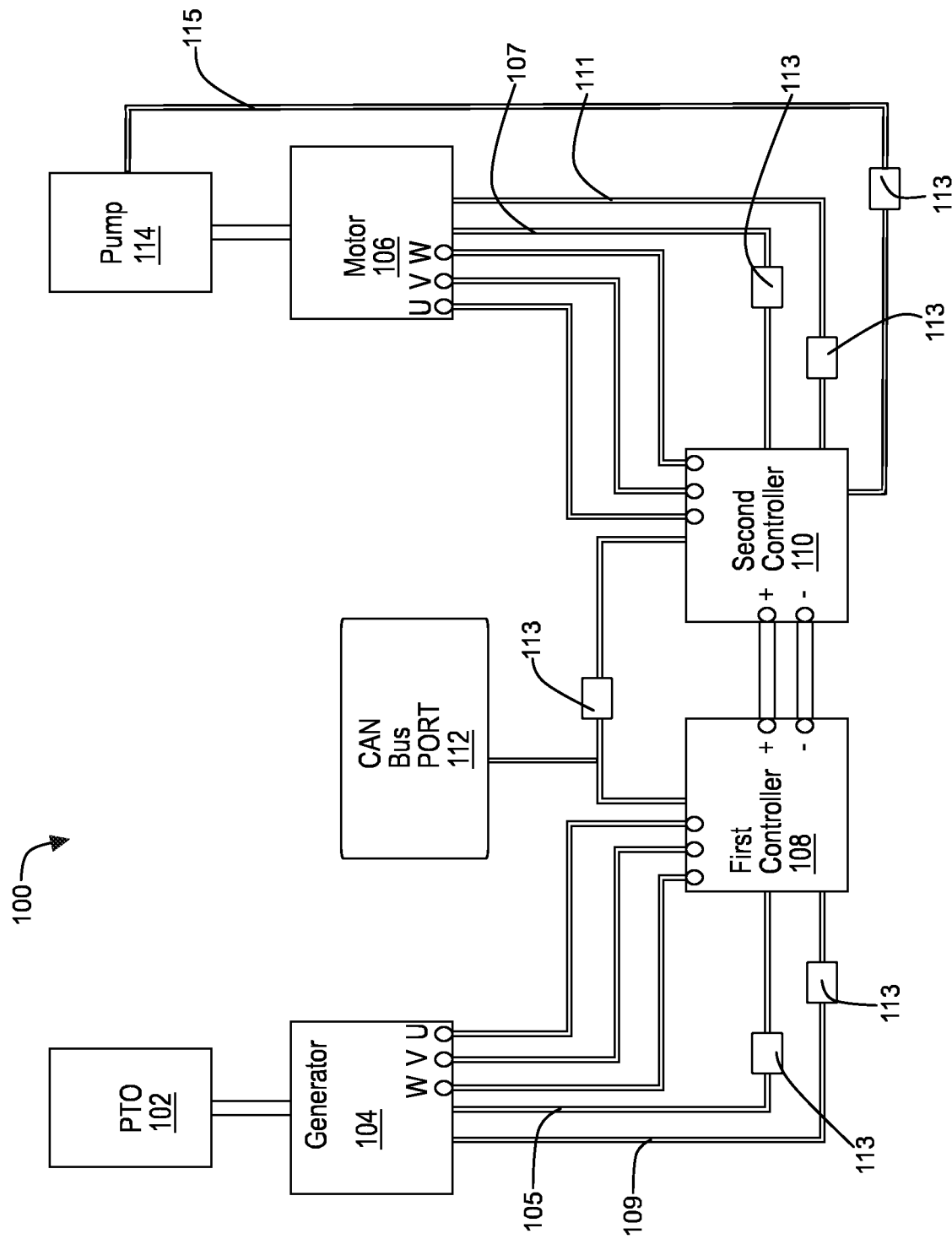
FIG. 1 illustrates an exemplary schematic diagram of a computer-controlled power take off (PTO) driven motor system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, any headings used herein are for organizational purposes only, and the terminology used herein is for the purpose of describing the embodiments. Neither are not meant to be used to limit the scope of the description or the claims.

Disclosed embodiments are directed to computer-controlled PTO-driven motorized pump systems. Some embodiments include a generator that is mechanically connected to a power takeoff (PTO), a first controller that receives AC power from the generator and converts the AC power to DC power to provide DC power to a computing system that has one or more processors and one or more computer-readable hardware storage media, a second controller directly coupled to the first controller and providing AC power to a motor that is mechanically connected to a pump (e.g., a vacuum pump or a gear pump, or other pump) and in communication with the computing system.

In some implementations, the computing system is in communication with one or more sensors connected to various portions of the computer-controlled motorized pump system. In some instances, the computing system is operable to execute instructions for providing notifications or deactivating the motor in response to triggering events, such as detecting that a sensor reading of the one or more sensors has met or exceeded a predetermined threshold value. The computing system may be in communication with one or more administrative computing systems.

Those skilled in the art will recognize that the disclosed embodiments may address many of the problems associated with semi-truck pump systems. For instance, disclosed embodiments eliminate high-pressure hydraulic lines and pumps, ameliorating the possibility of hydraulic line ruptures and/or leaks and the associated repair/cleanup expenses. Additionally, the pump efficacy of the disclosed embodiments will be less affected or unaffected by environmental temperature. Large cooling systems associated with wet kits are avoided by the embodiments of the present disclosure, allowing the vacuum or other pump to be placed on the catwalk (or anywhere desired). Long drivelines, U joints, and carrier bearings are avoided by the present embodiments, along with all mechanical failures and injuries associated therewith.

The presently disclosed pump systems may allow vacuum pumps to last up to, or more than, three times as long as they do when implemented on a wet kit or direct drive system. Regular maintenance of the components of wet kits or direct drive systems may be avoided. Additionally, because the disclosed pump systems are computer-controlled and at least some disclosed pump systems are in communication with administrative computing systems, many costly errors associated with user negligence may be avoided, such as running pumps without sufficient oil or while frozen fluids are in the lines, overheating the pumps, fluid spills from overfilling, failing to disengage the PTO, etc.

In view of the foregoing, the disclosed embodiments may allow freight companies to avoid considerable costs associated with repairing and replacing semi-truck pump equipment and/or remedying spills.

Having just described some of the various benefits and high-level attributes of the disclosed embodiments, additional detail will be provided with reference to the Figures, which show various examples, schematics, conceptualizations, and/or supporting illustrations associated with the disclosed embodiments.

FIG. 1 illustrates an exemplary schematic diagram of a computer-controlled power take off (PTO) driven motor system 100. The PTO 102 may be mechanically connected to the transmission of a semi-truck, such that the PTO 102 is actuated by running the engine of the semi-truck. As shown, the PTO 102 is mechanically connected to a generator 104 so that the generator 104 may be actuated by the PTO 102 to generate AC power. FIG. 1 shows the generator 104; however, it will be appreciated that the generator 104 may be implemented as an electronic motor that is reversibly operable to receive rotational force to generate AC power or receive AC power to generate rotational force. In this regard, two motors that are identical may be implemented as the generator 104 and a motor 106 for driving the vacuum pump (as described hereinbelow). In some embodiments, the motors 104, 106 are three-phase, water-cooled, permanent magnet motors (although other motors may be used).

In some instances (as shown in FIG. 1), the generator generates three-phase AC power (e.g., to maintain a high peak voltage), as represented by the W, V, and U wires extending from the generator. The generator provides AC power to a first controller 108, which converts the AC power into DC power. In some implementations, the first controller 108 is implemented as a rectifier or another circuit/system suitable for converting AC power into DC power. Accordingly, the first controller 108 may provide DC power to one or more computing systems (e.g., electronic control modules (ECMs) shown in FIG. 6). In some instances, one or more computing systems are implemented into the first controller 108 and/or a second controller 110 and are in communication with each other and/or with outside computing systems, devices, or components, as represented in FIG. 1 by the CAN Bus Port 112 extending from the first and second controllers 108, 110. It will be appreciated that other positionings of the computing system(s) are within the scope of this disclosure. Further, while multiple controllers are illustrated, it will be appreciated that the components of the various controllers may be combined into a single controller.

In its most basic configuration, a computing system includes a processor and a computer-readable hardware storage medium that may hold computer-executable instructions for execution by the processor. The processor and the computer-readable medium may be combined, such as by using a microcontroller. A computing system may also include (or are in wired or wireless communication with) a user interface, such as a controller with one or more input triggers (e.g., buttons, touch screen(s), etc.). In some implementations, the computing system(s) is(are) in communication (via a wired or wireless connection) with one or more user interfaces for communicating information to a user and/or receiving user input. Additional details, functionalities, and configurations of the computing system(s) of the present disclosure will be described in more detail hereinafter with reference to FIGS. 7-9.

Referring back to FIG. 1, the first controller 108 is directly coupled to the second controller 110 with two DC coupling wires. The second controller 110 is operable to invert the DC power back into AC power (e.g., three-phase AC power with attendant wiring, as described above) to provide AC power to the motor 106. In some instances, the motor 106 is a motor that is identical to the generator 104, although reversely operated (i.e., the motor 106 receives AC power and generates rotational force, rather than receiving rotational force from the PTO 102 and generating AC power).

Because of the DC coupling between the first and second controller 108, 110 (e.g., converting from AC power from a generator into DC power, and then inverting the DC power back into AC power again to power another motor), the PTO-driven motorized pump systems of the present disclosure may be computer-controlled (e.g., by the computing system(s) referred to above), providing input, monitoring, communication, sensing, notification, and/or safety functionalities that may protect the pump system components, reduce dependence on user attentiveness/care, increase control by administrators (e.g., fleet commanders, freight companies), and/or increase the productivity of semi-trucks pulling tank trailers. By way of example, in some embodiments, the computing systems of the first and/or second controllers 108, 110 are in communication with sensors (e.g., temperature sensors, voltage sensors, pressure sensors, etc.) that are connected to the generator 104 and the motor 106 indicated in FIG. 1 by generator sensor cable 105 and motor sensor cable 107. Additionally, in some embodiments, the computing systems of the first and/or second controllers 108, 110 are configured to be able to selectively activate or deactivate (or otherwise control) the generator 104 and the motor 106 (e.g., as indicated in FIG. 1 by encoder cable 109 and encoder cable 111). It will be appreciated that the various cables may be coupled to one another using standard AMP connectors 113. In some instances, the computing system(s) within the first and/or second controllers 108, 110 may deactivate the generator 104 or the motor 106 in response to user input and/or in response to detecting that temperatures, voltages, pressures, or other indicators are outside of operational ranges. For example, one or more sensors may be coupled to A) the generator 106 via cable 105, B) the motor 106 via cable 107, C) the pump 114 (or its components) via pump sensor cable 115. These and other features associated with the computing system(s) will be described in more detail with reference to FIGS. 7-9.

FIG. 1 illustrates that the motor 106 is mechanically connected with a pump 114 (e.g., vacuum pump or gear pump), such that the motor 106 is able to drive the pump 114 when the motor 106 receives AC power from the second controller 110. When driven by the motor 106, the pump 114 may, for example, load or unload a tank trailer that is connected to the pump 114. Accordingly, by using the generator 104 and the motor 106, the PTO-driven motorized pump systems of the present disclosure avoid problems associated with high-pressure hydraulic lines, hydraulic pumps, hydraulic motors, and drivelines spanning the distance between the PTO 102 and the pump 114.

Figure 2A:
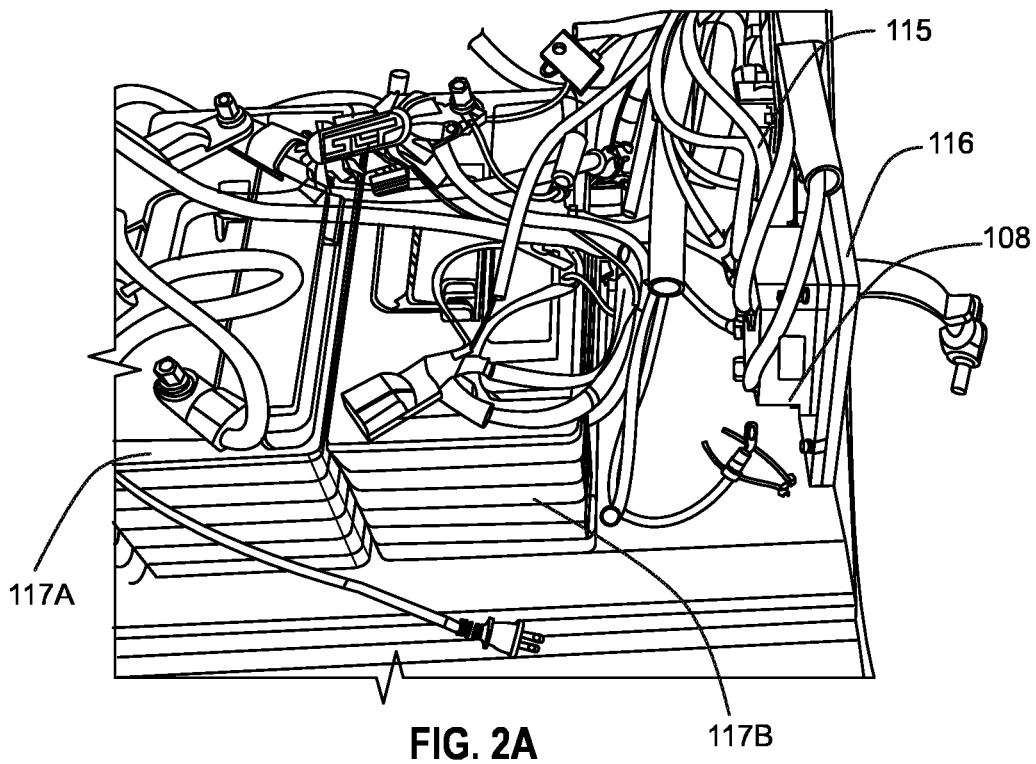
FIG. 2A illustrates an example embodiment of a first controller implemented on a semi-truck.
Figure 2B:
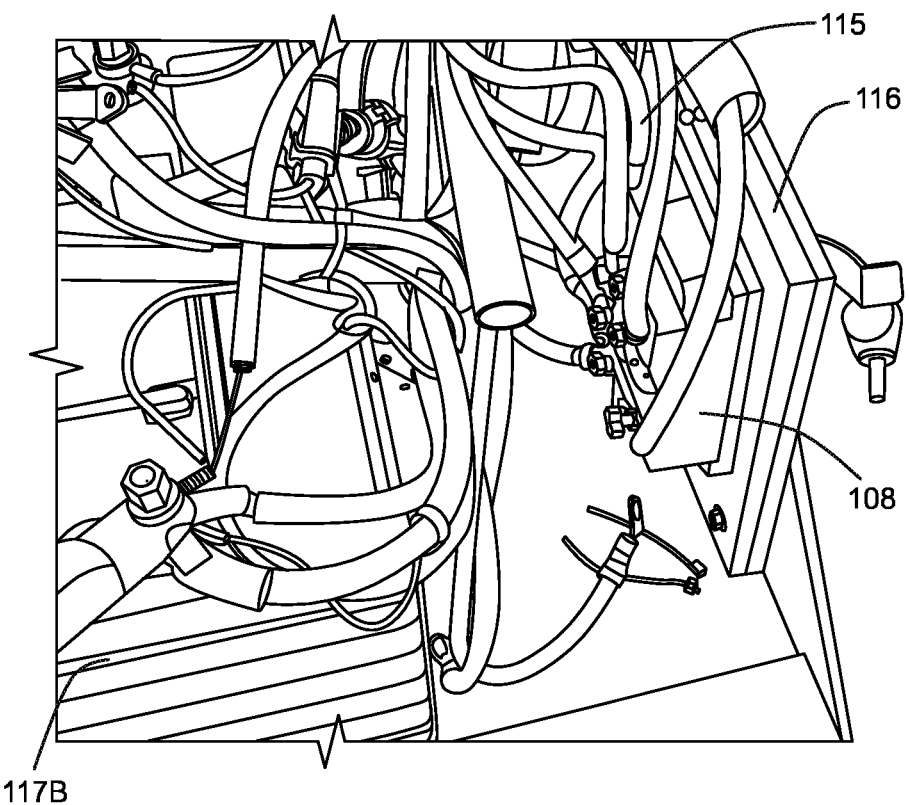
FIG. 2B illustrates an example embodiment of a first controller implemented on a semi-truck.

FIGS. 2A and 2B illustrate an example embodiment of the first controller 108 implemented on a semi-truck. The first controller 108 (e.g., a rectifier or other converter) is wired to receive AC power (e.g., three-phase AC power) from the generator 104 (FIG. 1) connected to the PTO 102 (FIG. 1) on the bottom of the semi-truck. The first controller 108 converts the AC power received from the generator 104 into DC power to power one or more computing systems. In the embodiments depicted, the first controller 108 is also in communication with one or more sensors connected to the generator 104 and configured to provide instructions to, and receive data from, the generator 104. In the embodiment shown, the first controller 108 includes a CAN bus port connector to connect with other computing systems. In some instances, the CAN bus port connector is also connected to the second controller 110 (FIG. 1). In this regard, the first controller 108 (or a computing system associated therewith) may allow for computer control of the generator 104 and/or other portions of the PTO-driven motorized pump system. The first controller 108 is also directly coupled to the second controller 110 (FIG. 1) via two DC wires to allow the first controller 108 to provide DC power to the second controller 110 (e.g., an inverter). In some embodiments, the first controller and/or the second controller 108, 110 may couple to a cooling plate 116 so as to prevent overheating.

As shown, the first controller 108 takes up minimal space and may be installed within limited spaces, such as on the steps of the driver's side of the semi-truck next to truck batteries 117A, 117B, but those skilled in the art will recognize that this placement is non-limiting and exemplary only. For instance, in some embodiments, the first controller is positioned proximate to (or implemented as part of) the second controller 110, or as part of the generator 104, or within the cab of the semi-truck.

Figure 3:
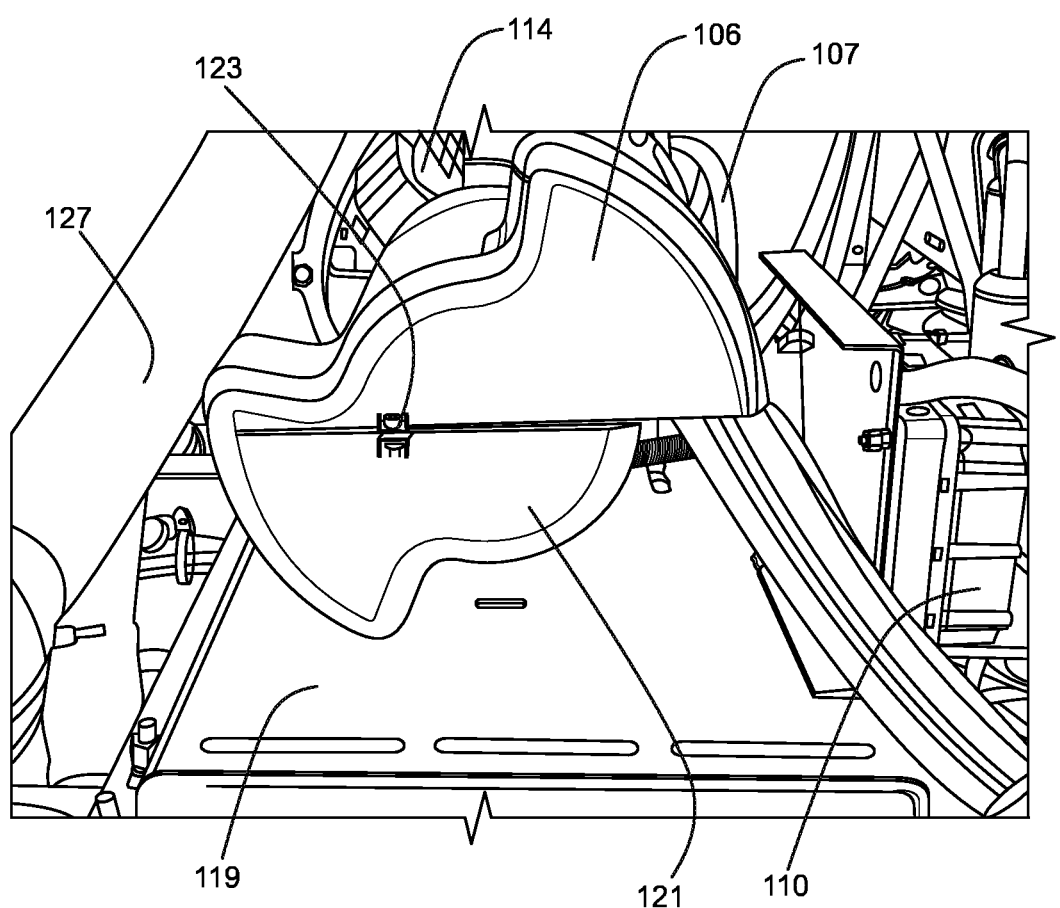
FIG. 3 illustrates an example embodiment of a second controller and motor implemented on a semi-truck.
Figure 4:
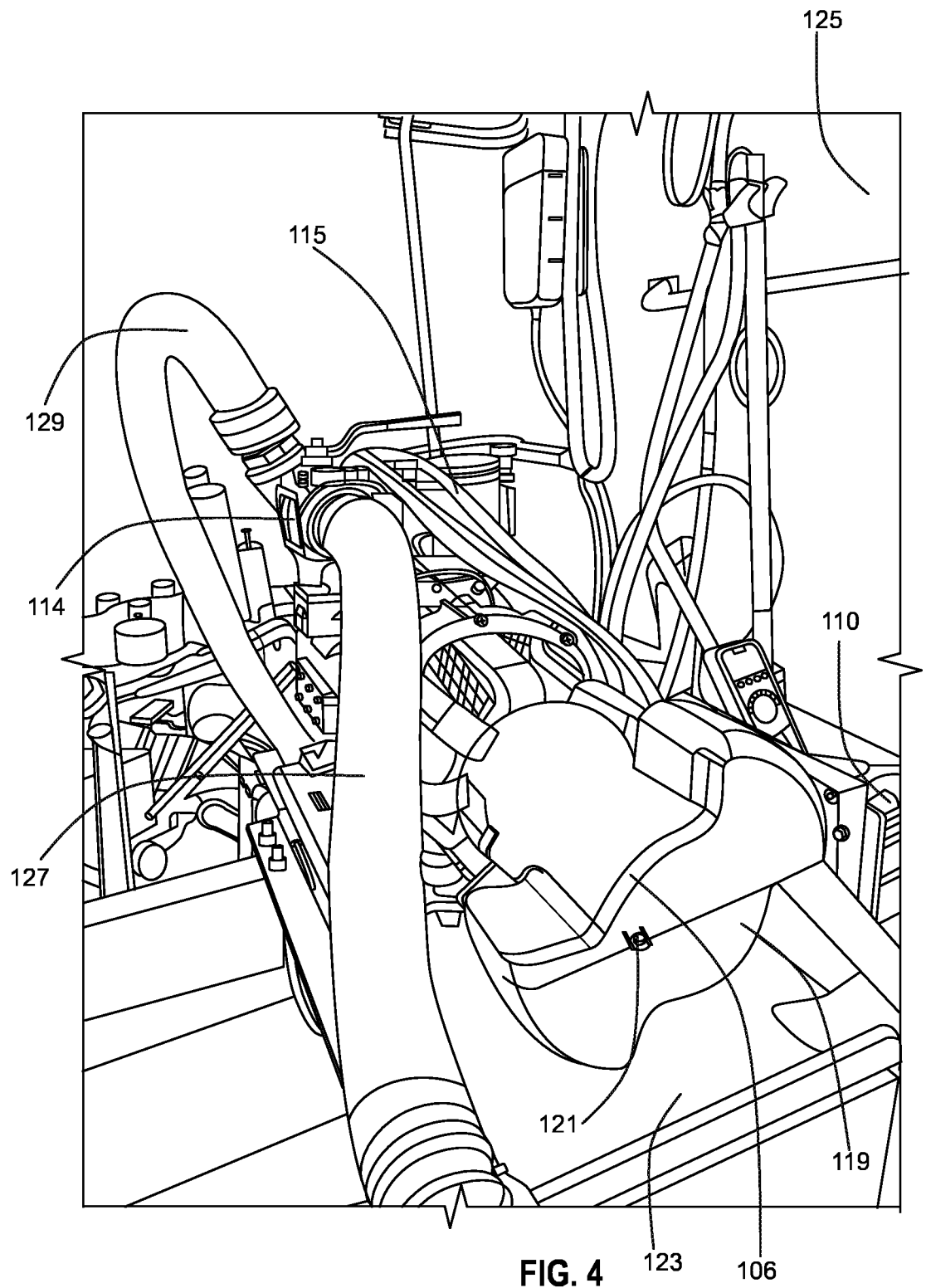
FIG. 4 illustrates an example embodiment of a pump, motor, and second controller implemented on a semi-truck.

FIG. 3 illustrates an example embodiment of the second controller 110 and motor 106 implemented on a semi-truck, the motor actuating a pump 114 (best seen in FIG. 4). The second controller 110 receives DC power from the first controller 108 via the direct coupling and inverts the DC power back into AC power (e.g., three-phase AC power) and provides the AC power to the motor 106, which in turn actuates the pump 114.

The second controller 110 is also in communication with one or more sensors (e.g., temperature sensors, voltage sensors, etc.) connected to the motor 106 via one or more cables (e.g., motor sensor cable 107) and configured to provide instructions to and receive data from the motor 106, either by using motor sensor cable 107 or encoder cable 111. In this regard, the second controller 110 (or a computing system associated therewith) may also allow for computer control of the motor 106 and/or other portions of the PTO-driven motorized pump system 100.

As shown, the second controller 110 is installed on the catwalk 119 behind the cab of the semi-truck, but it will be recognized that other placements are within the scope of this disclosure. For instance, in some embodiments, the second controller 110 is positioned proximate to, or implemented as part of, the first controller 108 or the motor 106, within the cab of the semi-truck, or suspended over a side of the catwalk.

FIG. 4 illustrates an example embodiment of the pump 114 (e.g., vacuum pump), motor 106 (enclosed in a housing 121 that may be opened using latch 123, a cap, or similar mechanism), and second controller 110 implemented on a semi-truck 125. The motor 106 is mechanically connected to the pump 114 to drive the pump 114 using the AC power received from the second controller 110. Accordingly, the pump 114 may be connected to a reservoir (e.g., a tank trailer), such as by using hoses 127, 129, to load or unload the reservoir in a manner that is indirectly driven by a PTO while avoiding high-pressure lines, long drive lines, and other problems associated with conventional systems for driving a pump with a PTO.

In the embodiment shown in FIG. 4, the pump 114 is implemented as a vacuum pump that is advantageously positioned on the catwalk 119 so as to avoid debris contact that occur when the pump 114 is suspended over a side of the catwalk, as is the typical case with a wet kit or direct drive system. It will be appreciated that other pumps are within the scope of this disclosure (e.g., a gear pump), and the positioning of the pump 114 is not limited to the catwalk 119, as shown. For instance, a pump may be implemented as a gear pump or a vacuum pump positioned on the tank trailer (see, e.g., FIG. 6).

Figure 5:
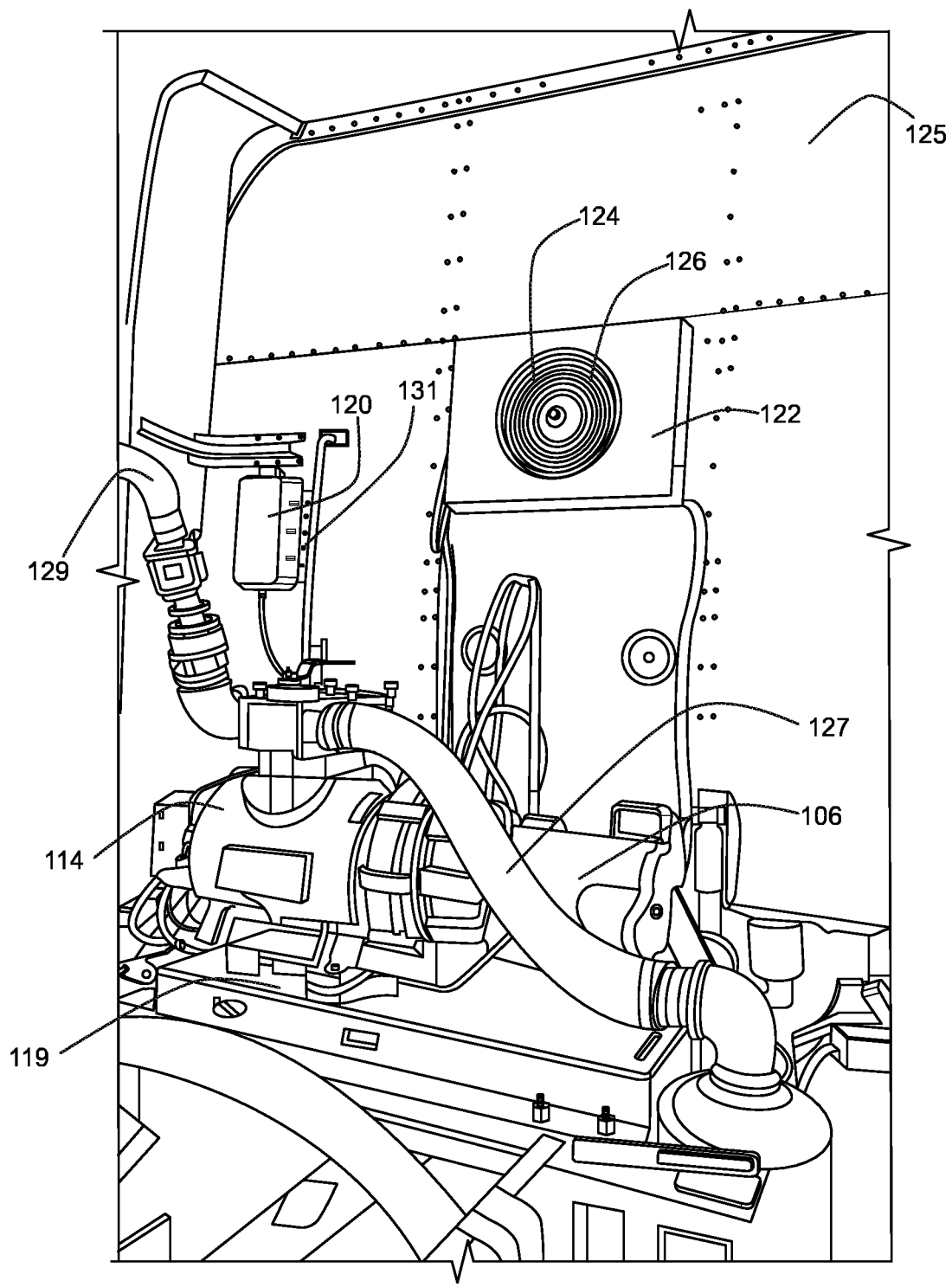
FIG. 5 illustrates an example embodiment of a vacuum pump, vacuum pump oil reservoir, and cooling system implemented on a semi-truck.

It should be noted that the computer-controlled PTO-driven motorized pump system 100 may include other components (also referred to as "pump components") not shown in the schematic diagram of FIG. 1. For example, FIG. 5 illustrates an example embodiment of a vacuum pump oil reservoir 120 and cooling system 122 implemented on a semi-truck 125. The vacuum pump oil reservoir 120 is in fluid communication with the pump 114 to provide oil to the pump 114 for cooling and/or lubrication. In many instances, users negligently allow for the oil reservoir 120 of a pump 114 to become exhausted and run the pump 114 without sufficient oil, resulting in costly damage and/or destruction to the pump 114. In FIG. 5, the vacuum pump oil reservoir 120 includes a sensor 131 for detecting that the oil level is low. The oil reservoir sensor 131 may also be in communication with a computing system as described herein (e.g., controller 110), such that a computing system may receive sensor data from the vacuum pump oil reservoir sensor 131 and execute commands in response to detecting certain sensor readings. For example, if the oil reservoir sensor 131 detects that the oil in the reservoir 120 is below a predetermined threshold, the controller 110 shuts off power to the motor 106 so that it is not rendered unusable. It will be appreciated that the computer system may terminate the power generation for the system in more than one location, depending upon configuration. In one example, the reservoir sensor 131 is coupled to the first controller 108. The first controller 108 may then disconnect the power to the entire system via a contactor or solenoid coupled to, or incorporated in, the generator 104 or motor 106. If coupled to the generator 104, the controllers 108, 110 may use an additional power source, such as truck batteries 117A, 117B (or other batteries or power sources) to continue to operate even when the generator 104 ceases producing power due to the contactor terminating the power.

The cooling system 122 of the embodiment shown in FIG. 5 includes a radiator 124 having a fan 126 and is connected to, and in fluid communication with, one or both of the generator 104 and the motor 106. As noted above, one or more temperature sensors may be coupled to the generator 104 and/or motor 106, and a failure in the cooling system 122 may therefore be detected based on the sensed temperatures of the generator 104 and/or motor 106. While the cooling system 122 is shown coupled to the motor 106, it will be appreciated that the same cooling system 122 or an alternate cooling system may be coupled to the generator 104.

As previously mentioned, the pump 114 includes a number of sensors connected thereto. Vacuum pump sensors may include, but are not limited to, pressure sensors, revolutions per minute (RPM) sensors, torque sensors (e.g., for preventing damage caused from running a frozen, dry, or damaged pump), temperature sensors, or other sensors beneficial for determining potential failures of the pump. As with the aforementioned vacuum pump oil reservoir sensor 131, these sensors may be in communication with a computing system (such as first controller 108, second controller 110, or third sensor controller (discussed later)) that is configured to receive the sensor data and issue commands to control the motor 106 based on the received sensor data (as described hereinbelow).

Figure 6:
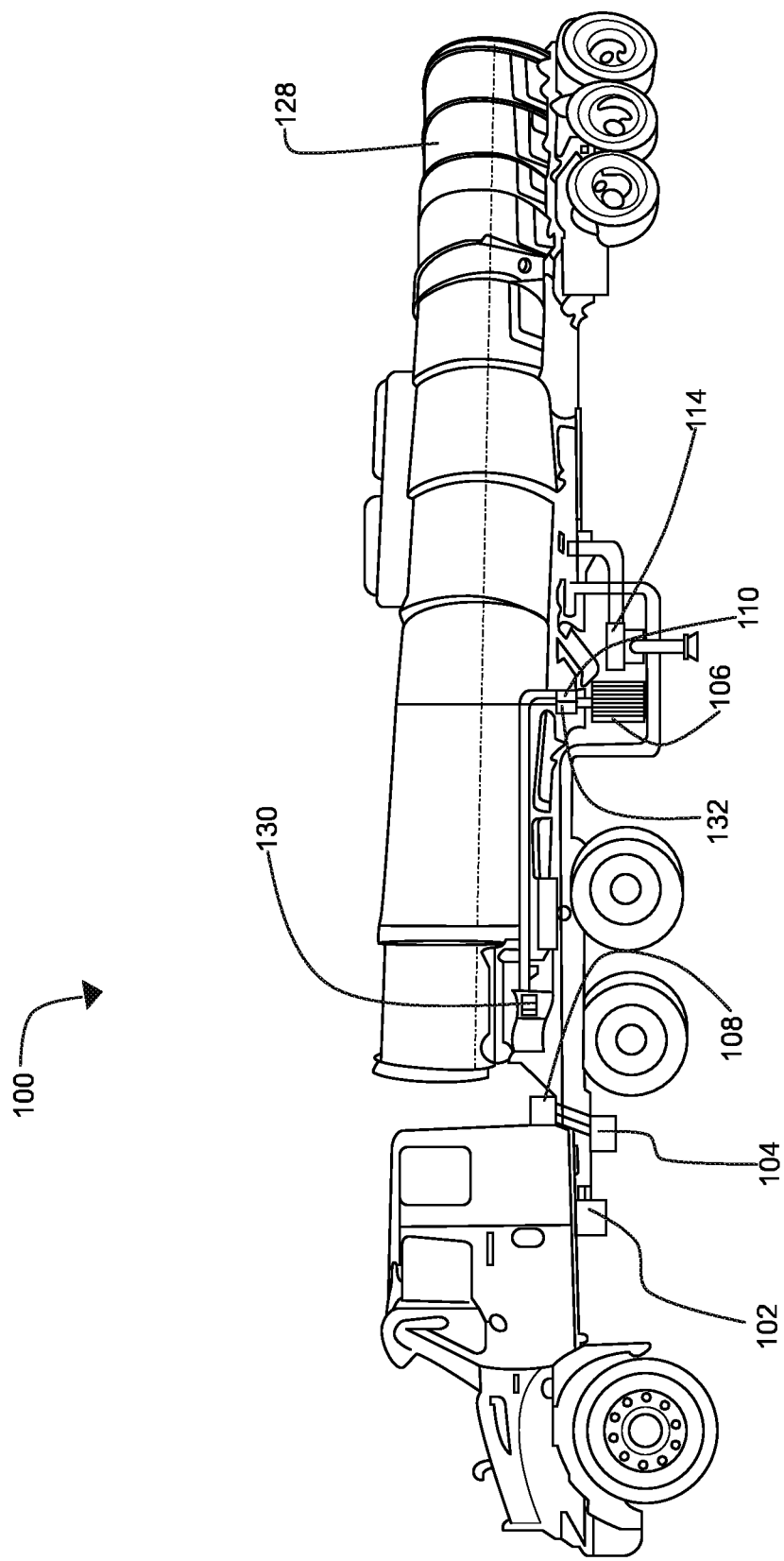
FIG. 6 illustrates an exemplary embodiment of a computer-controlled power takeoff driven motorized pump system implemented on a semi-truck.

FIG. 6 illustrates the computer-controlled PTO-driven motorized pump system 100 implemented on a semi-truck and tank 128. As shown, the PTO 102 is mechanically connected to the generator 104. The generator 104 provides AC power (e.g., 3-phase AC power) to a first controller 108 (rectifier or other controller/device) for converting the AC power into DC power. The first controller 108 may include, or be in communication with, in some embodiments, an on/off switch 130, digital readouts (e.g., of barrels or weight, flow rate, etc.), and/or other controls for controlling the motorized pump system 100. The first controller 108 provides DC power to an electronic control module 132 ("ECM"), which may be incorporated as part of the second controller 110, or be separate therefrom (i.e., a standalone control module), and include communication channels (e.g., Bluetooth® compatibility, wired connections) for receiving sensor readings (e.g., from a current or voltage sensor, or PSI gauge to detect the PSI of a hose, or temperature sensor, etc.) and/or commands from user interfaces and/or other computing systems. The second controller 110 inverts the DC power back into AC power (e.g., 3-phase AC power) and provides the AC power to a motor 106 that drives the pump 114, which may be implemented as a gear pump or vacuum pump for pumping fluid through a hose hookup. As shown in FIG. 6, the pump 114 may be located under the tank 128 and need not be on the catwalk 119.

In some embodiments, the first controller 108 provides a portion of the DC power to one or more auxiliary batteries (e.g., a battery bank) or other energy storage element for storing energy for use when the diesel truck engine is not running. In such embodiments, the truck engine may be off, yet the batteries may supply AC power to the motor 106 via the second controller 110 (which inverts the DC power to AC power). Additionally, other truck and trailer components may utilize the power stored in the auxiliary batteries, such as the climate control system of the cab, microwaves, or other driver conveniences (collectively referred to "auxiliary systems"). Additionally, fuel savings may be realized by utilizing the power from the auxiliary batteries. For example, if the voltage of the batteries exceeds a predetermined threshold, the power may then be supplied to other components, such as the climate control of the semi-truck. By providing power from the auxiliary batteries, it need not be supplied by the alternator, which reduces the mechanical load on the engine, thereby increasing fuel efficiency. In other embodiments, power may be provided back to the generator 104 after being inverted, with the generator translating that power into rotational forces back into the PTO, again improving fuel economy by reducing the mechanical load on the engine.

Although the particular components shown in FIG. 6 are illustrated in certain positions (e.g., the rectifier 108 is shown as being positioned on the catwalk 119 of the semi-truck, the rectifier 108, ECM 132, motor 106, and vacuum pump 114 are all shown as being affixed to various positions on the tank trailer 128), it will be appreciated that these positionings are illustrative only.

Figure 7:
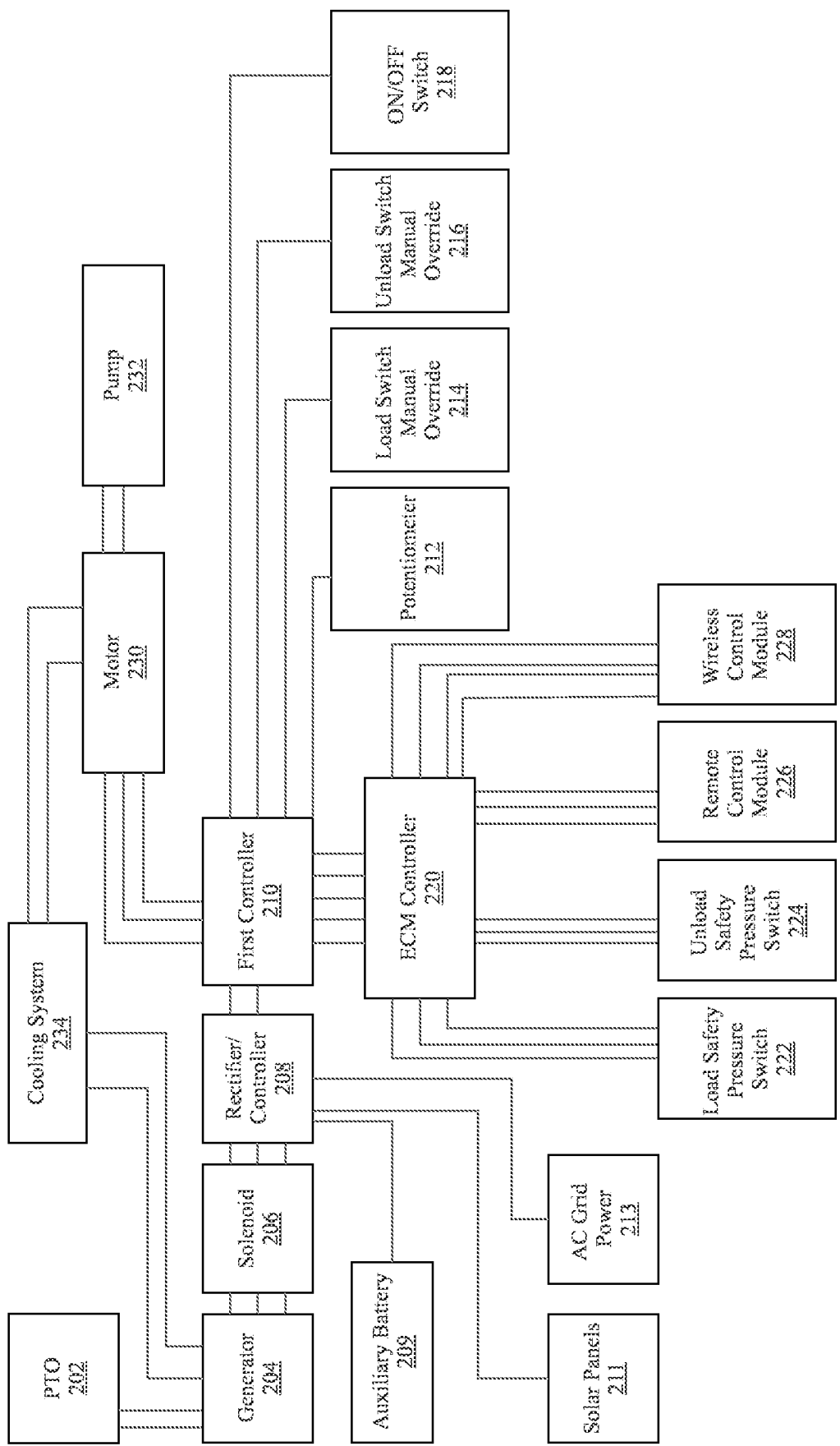
FIG. 7 illustrates an exemplary embodiment of a schematic diagram of a computer-controlled power take off (PTO) driven motor system.

FIG. 7 illustrates a block diagram of a computer-controlled PTO-driven motorized pump system 200. While discussed as a separate embodiment using differing Figure labels, the components and features discussed hereafter may be combined with the features hereinbefore discussed. To start the system 200, an ON/OFF switch located in the cab of semi-truck, or any other location, is activated. The computer-controlled PTO-driven system includes a PTO 202 mechanically connected to a generator 204 and operable via a lever or switch. In some embodiments, the PTO 202 engages and starts the system 200 automatically. Further, in some embodiments, the PTO 202 may be continuously engaged to the generator 204, regardless of whether a user is using a pump. In a scenario where the PTO is continuously engaged to the generator 204, a solenoid 206 (or other suitable mechanism, such as a contactor), prohibits power from distributing through the system to the motor 230 and pump 232 when not in use. In some embodiments, the solenoid 206 is a three-phase disconnect. In one embodiment, the solenoid 206 is positioned within the housing of the generator 204 to prevent any live wires exiting the generator 204 when the solenoid 206 is disconnected.

However, in some embodiments, with the PTO 202 continuously engaged, the generator 204 may send AC power to the rectifier 208. When a user is not using the motor 230, such as when driving, the rectifier 208 may charge one or more auxiliary batteries 209. Once the auxiliary batteries 209 are above a predetermined threshold, power may then be diverted from the auxiliary batteries 209 to other components (e.g., climate control or back into the PTO 202) to increase fuel efficiency. It will be appreciated that the auxiliary batteries 209 may also receive a charge from other sources, such as solar panels 211 or through grid power 213 using an electrical outlet and plug (e.g., 220 Volts). In such embodiments, energy stored in the auxiliary batteries 209 may significantly increase the fuel economy of the diesel engine by utilizing that energy for driver comforts, mechanical energy through the generator 204 to the PTO, or to run the motor 230 and pump 232 (without need for the diesel engine to run).

Returning to FIG. 7, the generator 204 provides AC power (e.g., 3-phase AC power) to a rectifier 208 (or other converter or controller) for converting the AC power into DC power. The rectifier 208 may be in communication with a first controller 210, which may be in communication with external controls, such as a potentiometer 212 (e.g., 5V variable speed potentiometer) to manually adjust the speed at which liquid flows, a manual override load switch 214 to start the flow of liquid, a manual override unload switch 216 to release liquid from a reservoir tank, and an on/off switch 218. Other digital readouts (e.g., of barrels or weight, flow speed, etc.), and/or other controls for controlling the motorized pump system 200 may be implemented on the external controls (collectively referred to as "external controls"). While the rectifier/controller 208 and first controller 210 are shown as separate components, it will be appreciated that they may combined into a single controller unit.

The first controller 210 provides DC power to an electronic control module 220 (ECM) that is in communication with, and monitors, various components and signals. For example, the ECM is in communication with a load safety pressure switch 222, an unload safety pressure switch 224, a remote control module 226, and a wireless control module 228. When pressure in the system exceeds a predetermined threshold (e.g., 25 PSI for the tank at the load safety pressure switch 222), the ECM controller 220 sends a signal to the solenoid 206 to disconnect the power, preventing damage to the truck and system. The remote control module 226 may receive communication from a handheld remote, for example, so that the system 200 may be controlled remotely, such as while sitting in the cab of a semi-truck or at a distance from the truck. In regard to the wireless control module 228, a smart device (e.g., smartphone) or other user input devices with, for example, Bluetooth® may be utilized so as to communicate with the system 200.

The ECM 220 may further receive sensor readings (e.g., from a current or voltage sensor, PSI gauge to detect the PSI of a hose or tank, temperature sensors, etc.) and/or commands from user interfaces (e.g., the handheld remote or smart device) and/or other computing systems. These commands ensure the safety of the truck, its components, and the user, by terminating the pump 232 and/or other components of the system 200 when a sensor returns a reading that has been predetermined to be unsafe or undesirable (a triggering event). Additionally, the first controller 210 inverts the DC power back into AC power (e.g., 3-phase AC power) and provides the AC power to a motor 230 (e.g., a synchronous brushless induction motor, permanent magnet motor, or other suitable pump motor) that drives a pump 232, which may be implemented as a gear pump or vacuum pump for pumping fluid through a hose hookup.

A cooling system 234 may be in fluid communication with both the generator 204 and the motor 230, although they may also have separate cooling systems. One or more temperature sensors may be coupled to the generator 204 and/or motor 230, and a failure in the cooling system 234 may therefore be detected by the ECM 220 (or first controller 210, depending upon configuration) based on the sensed temperatures of the generator 204 or motor 230. It will also be appreciated that while the first controller 210 and the ECM controller 220 are shown as separate components, they may be combined into a single component.

Figure 8:
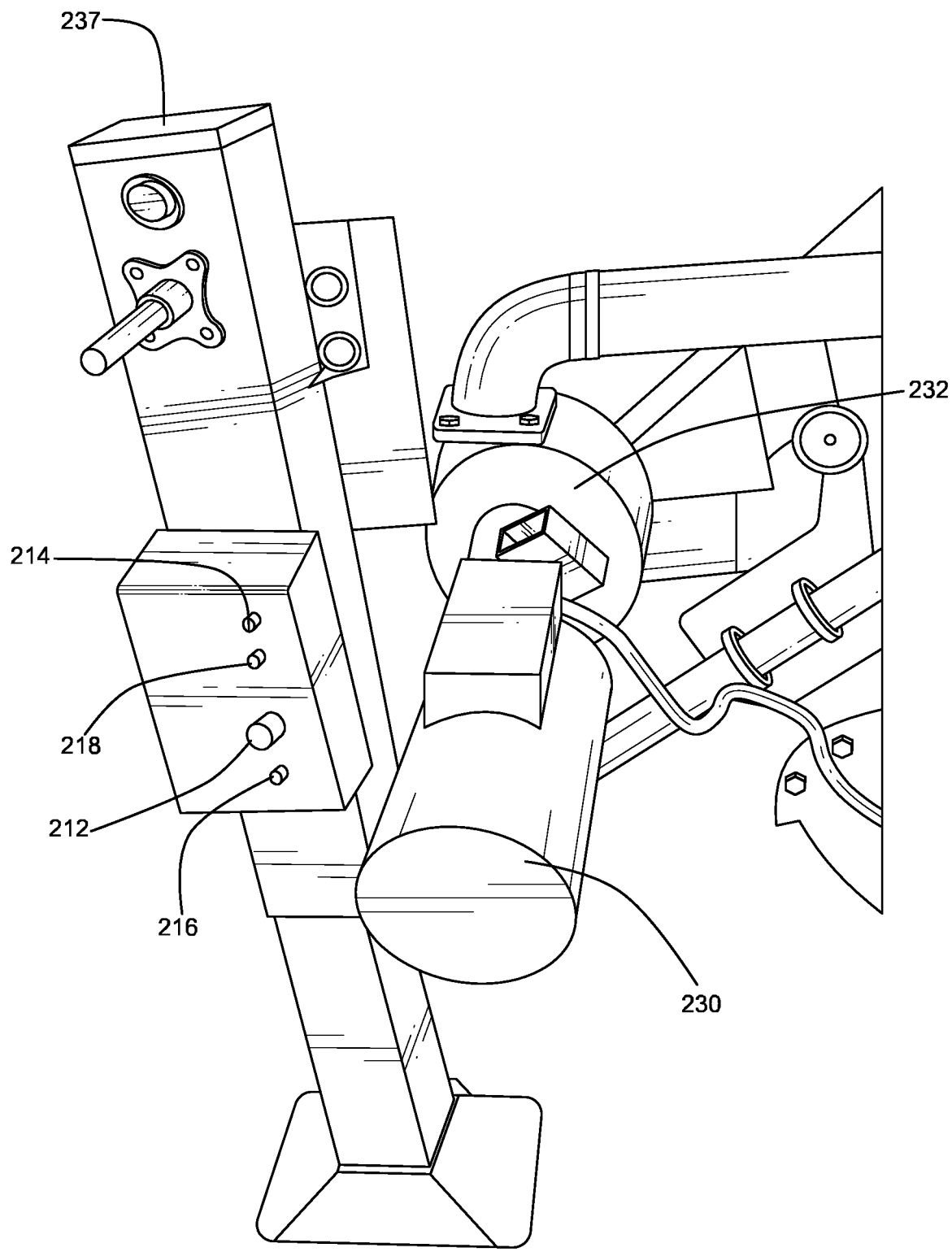
FIG. 8 illustrates an exemplary embodiment of override controls, a motor, and a pump implemented on a semi-truck.
Figure 9:
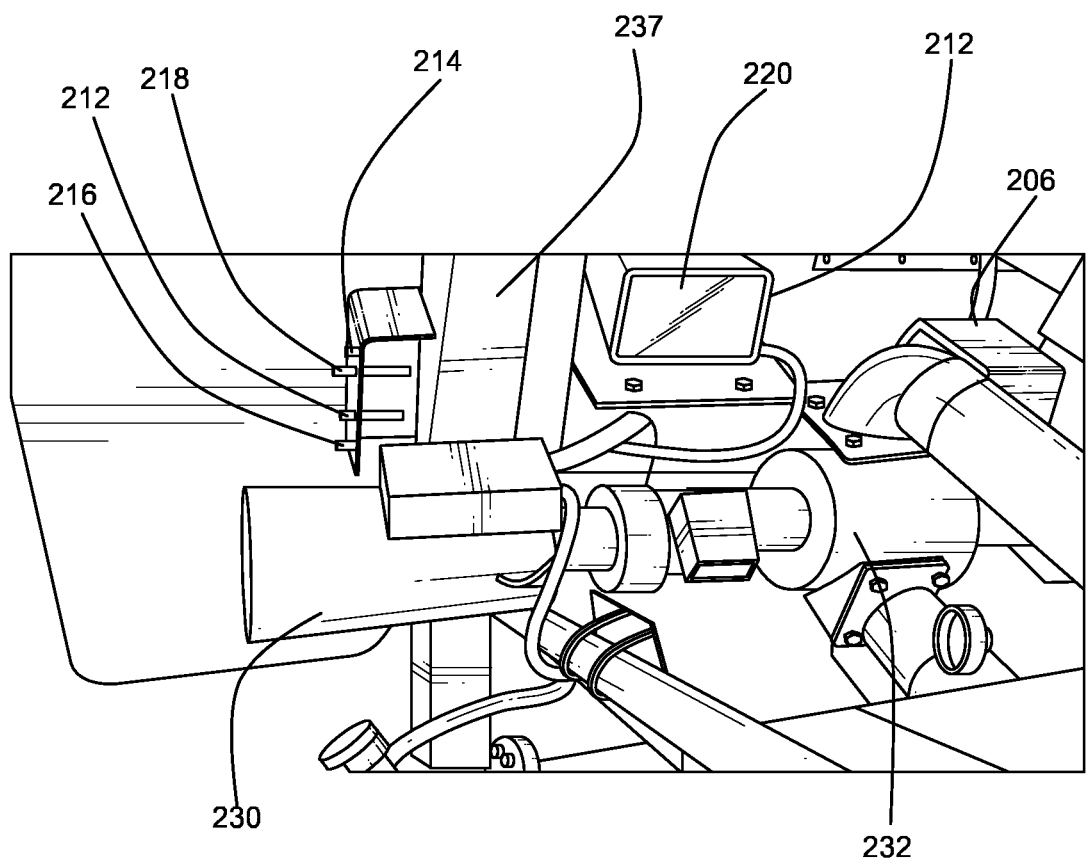
FIG. 9 illustrates an exemplary embodiment of external controls, an engine control module ("ECM"), a motor, and a pump implemented on a semi-truck.
Figure 10:
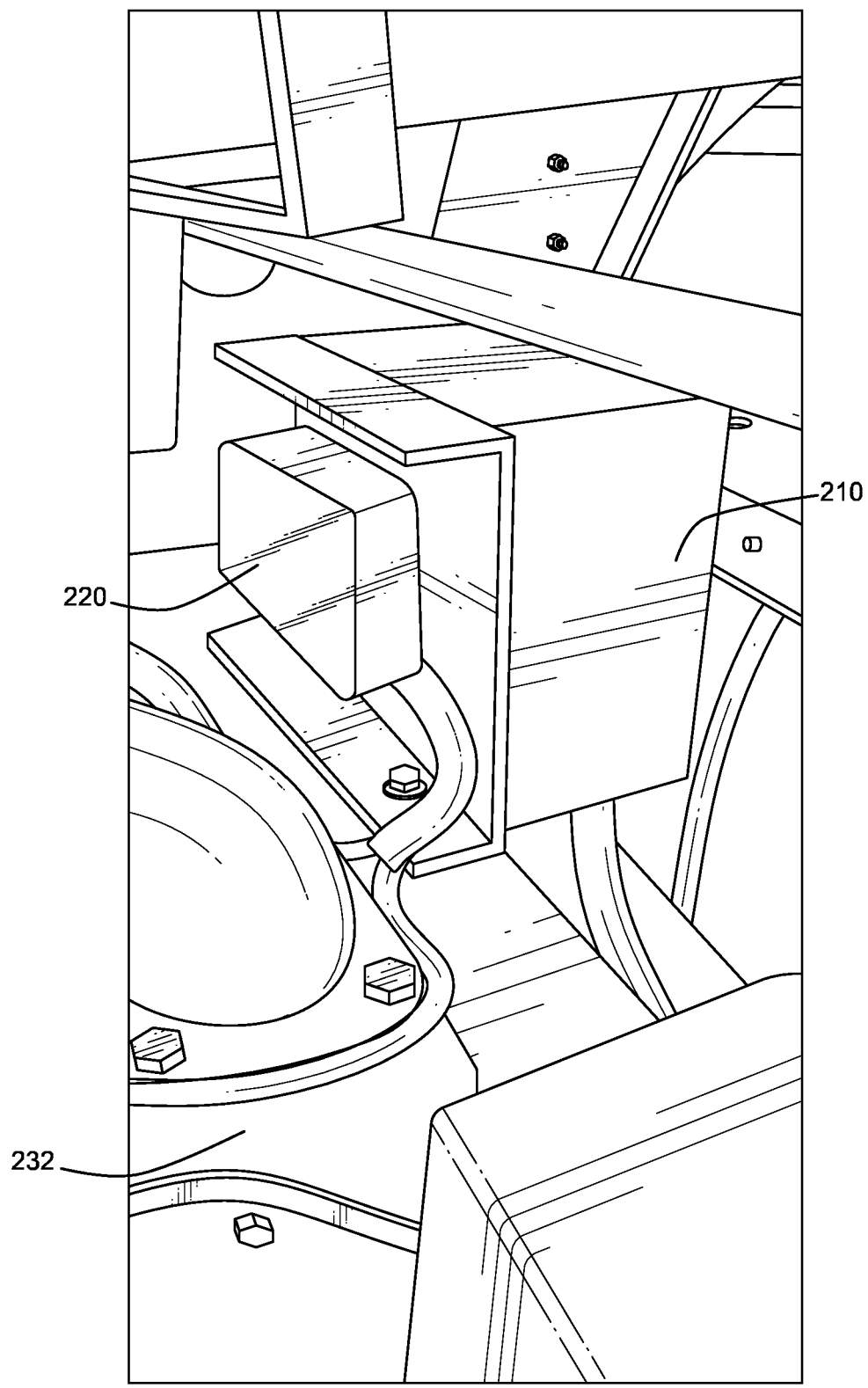
FIG. 10 illustrates an exemplary embodiment of an ECM and a first controller implemented on a semi-truck.

FIGS. 8-10 illustrate the aforementioned components of FIG. 7 on a semi-truck 237. The motor 230 is coupled to the pump 232, which may be a gear or a vacuum pump. Furthermore, the potentiometer 212 is shown, which may communicate with the first controller 212 and ultimately, the ECM controller 220 to control the rate at which liquid flows through the system 200. For example, in one embodiment, the potentiometer 212 may control the RPM of the motor 230 and, in a non-limiting example, may be adjusted between 300-900 RPM. It will be appreciated that by controlling the rate of flow, damage to the system 200 can be avoided while allowing a user to increase or decrease the flow rate. In addition, controlling the rate of flow can prevent leaks or spills, which can prevent environmental concerns or costly clean ups.

Figure 11:
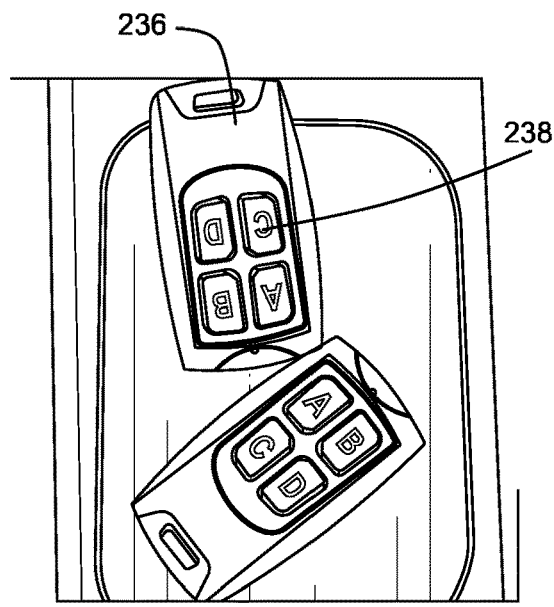
FIG. 11 illustrates an exemplary embodiment of a handheld remote of a computer-controlled PTO driven motorized pump system.

Referring to FIG. 11, in some embodiments, the ECM controller 220 receives input from a handheld remote 236 FIG. 11 or any other user device. The handheld remote may comprise user inputs 238 which may control power, unload, load, and other operations of the system 200.

Figure 12:
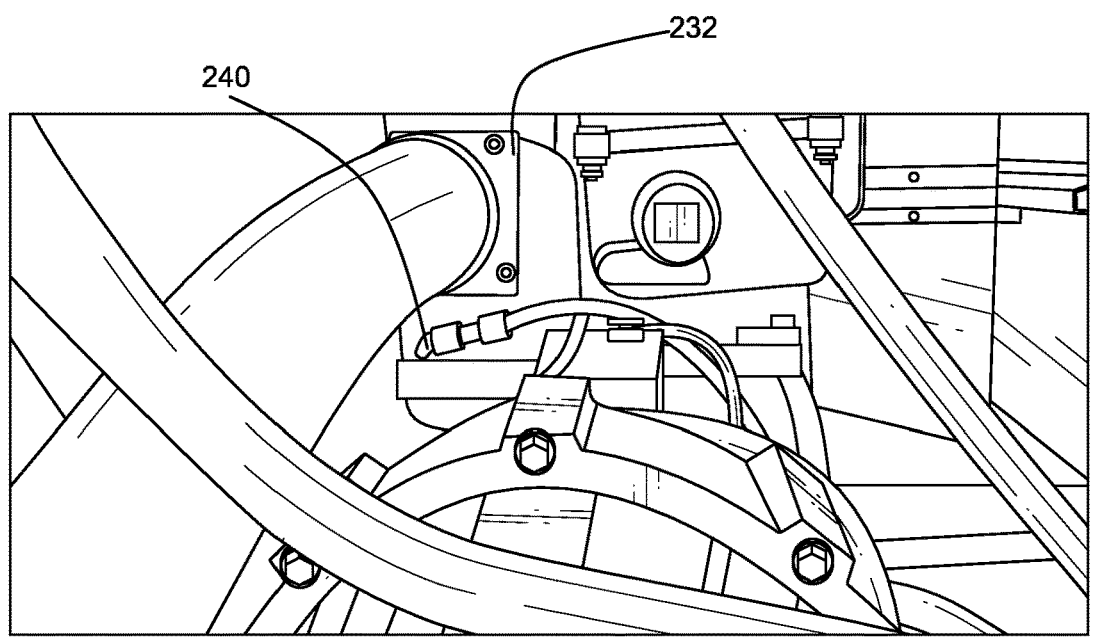
FIG. 12 illustrates an exemplary embodiment of a pressure sensor and a pump implemented on a semi-truck.

FIG. 12 illustrates a pressure sensor 240 in communication with the pump 232. If pressure exceeds a predetermined threshold (e.g., 25 PSI), the ECM 220 sends a signal to the solenoid 206 (or contactor or similar mechanism) to shut-off the system 200, thereby preventing damage. As discussed in earlier embodiments, the ECM 220 may have an alternate power source so that when the solenoid 206 disengages, the ECM 220 may continue to function and monitor the various components in the system 200. In one embodiment, the solenoid re-engages and provides power to the components of the system when the ECM 220 detects, via the pressure sensor 240, that the pressure is between 18 to 25 PSI. It will be appreciated that other sensors may be implemented and monitored by the ECM, such as temperature sensors, oil sensors, flow rate sensors, etc.

Figure 13:
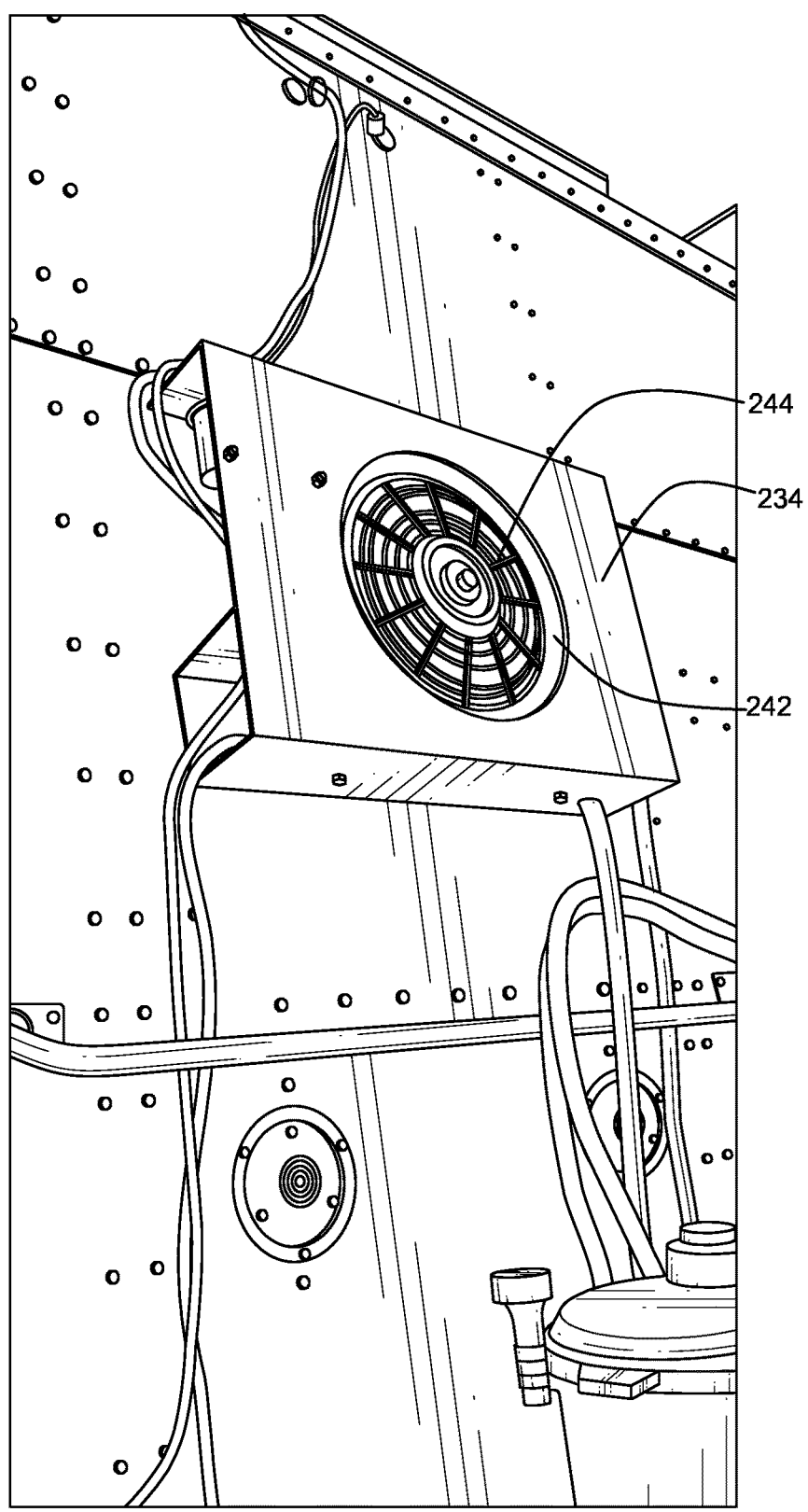
FIG. 13 illustrates an exemplary embodiment of a cooling system with a fan and a radiator implemented on a semi-truck.

Referring to FIG. 13, the cooling system 234 includes a radiator 242 and a fan 244 and is connected to and in communication with the generator 204 and the motor 230. It will be appreciated that while the generator 204 and the motor 230 may both be in communication with the cooling system, the cooling system may be in communication with the generator 204 and/or the motor 230. Although the particular components shown in FIGS. 8-13 are illustrated in certain positions (e.g., external controls, ECM, motor, and pump are all shown as being affixed to various positions on the tank trailer), it will be appreciated that these positionings are illustrative only.

Figure 14A:
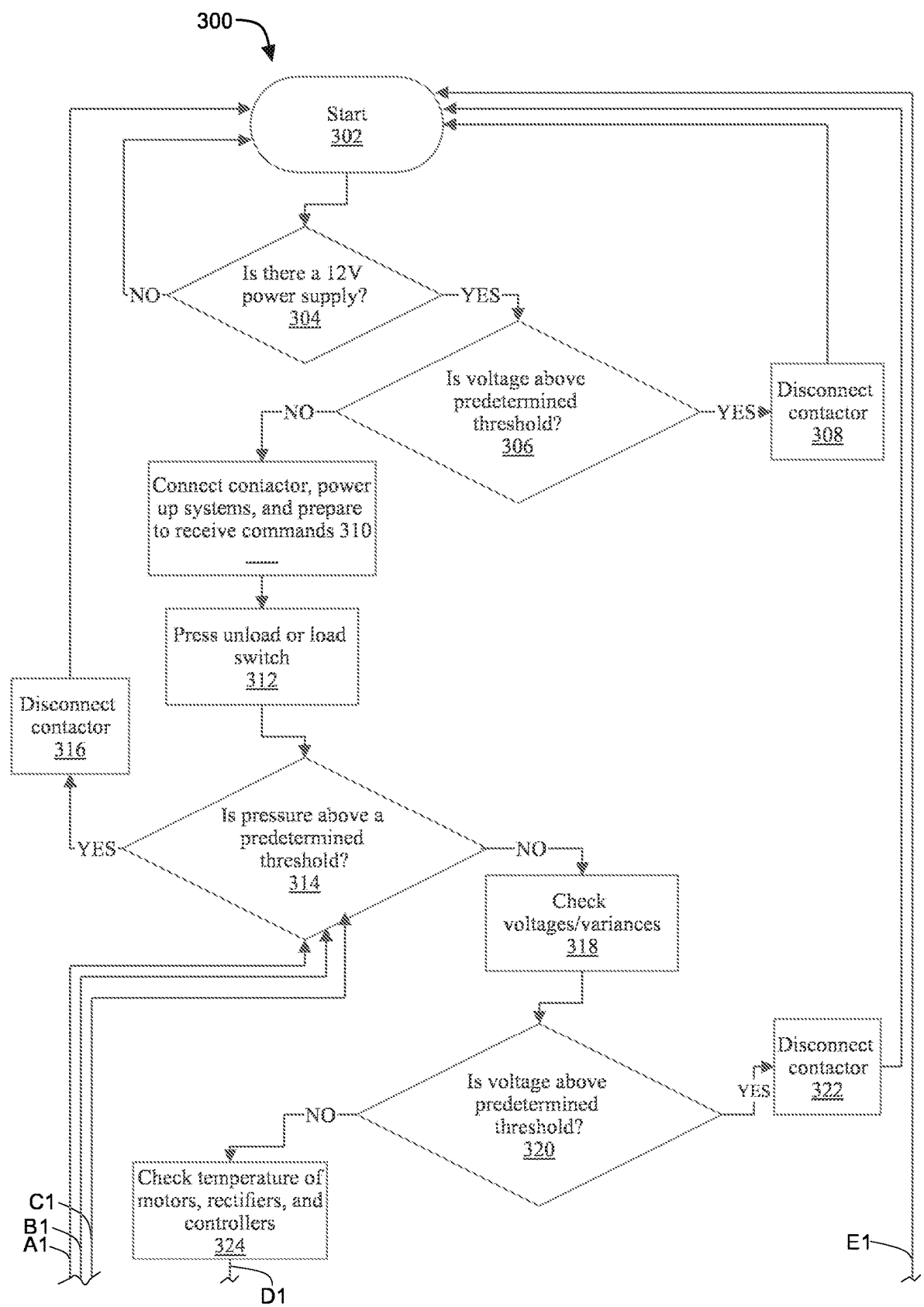
FIG. 14A illustrates a first portion of a flowchart representation of a computing system.
Figure 14B:
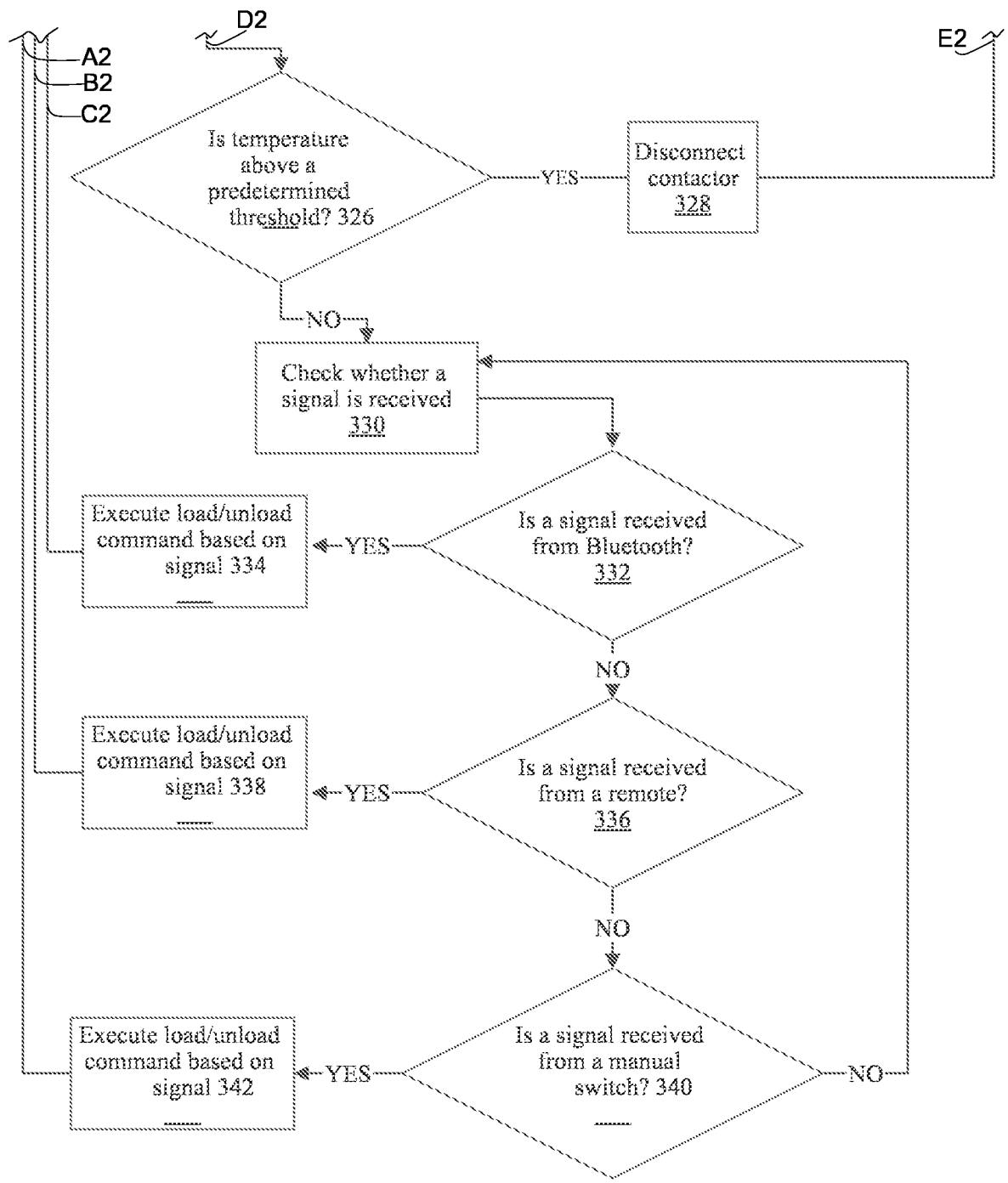
FIG. 14B illustrates a second portion of a flowchart representation of a computing system.

FIGS. 14A and 14B illustrate a flowchart representing a computing system 300 which may be implemented (e.g., programmed on the ECM 220 or other controller) in the computer-controlled PTO-driven motorized pump system 100 or 200. The computing system is activated at start 302 (such as when a user toggles a switch in the cab). Once the computing system 300 has started, it checks for a 12 V power supply in step 304. If there is not a power supply, the system 300 returns to the start 302. When it is determined that power is present, the system 300 proceeds to step 306. At step 306, it is determined whether the voltage is above a predetermined threshold. If the voltage is above the threshold, then, at step 308, the contactor (or solenoid, relay, etc.) remains disconnected or is disconnected, cutting power to the remaining components in the system, and the system 300 returns to the start 302. When the voltage is below a predetermined threshold, at step 310, the contactor is connected and the remaining components of the system receive power and are prepared to receive commands. Proceeding to step 312, the unload or load switch is pressed (either on a remote, smartphone, or switch on the truck). After the switch is pressed, the system 300 determines, at step 314, if the pressure is above a predetermined threshold. When the pressure is above the threshold, the contactor is disconnected at step 316 and the system returns to step 302. If the pressure is below the threshold, then at step 318 the voltages and variances are checked. As the voltages are checked in the computing system 300, it determines at step 320 whether the voltages are above a predetermined threshold. If the voltages are above the threshold, then at step 322 the contactor is disconnected.

However, when the voltage is at or below the threshold, at step 324 the temperature of the motors, rectifier, and controllers is analyzed. After step 324 (shown in FIG. 14A at D1), the system moves to step 326 (shown in FIG. 14B at D2). Once the temperature of the system 300 is analyzed at step 324, it is then determined whether the temperature is above a predetermined threshold at 326. If it is, then at step 328 the contactor is disconnected so as to prevent damage to the system 300, the system then returns to step 302 (shown at E2 on FIG. 14B and proceeding to E1 on FIG. 14A). When the temperatures are at or below the threshold, the system 300 determines whether a signal has been received at step 330. The computing system 300 then determines if the signal is received via Bluetooth® at step 332. If the signal is received via Bluetooth®, then at step 334 an unload/load command based on the signal is executed and the system 300 returns to step 314 (shown by C2 on FIG. 14B and proceeding to C1 on FIG. 14A). When the signal is not received by Bluetooth®, the system 300 determines whether a signal is received from a remote at step 336. If the signal is from a remote, then at step 338 an unload/load command based on the signal is executed and the system 300 returns to step 314 (shown by B2 on FIG. 14B and proceeding to B1 on FIG. 14A). If the signal is not received from the remote, then the system 300 determines whether the signal is received from a manual switch. If the signal is from the manual switch, then at step 342 an unload/load command based on the signal is executed and the system 300 returns to step 314 (shown by A2 on FIG. 14B and proceeding to A1 on FIG. 14A). However, if a signal is not received via any of the previously discussed methods, the system 300 returns to step 330 to verify whether a signal has been received. It will also be appreciated that override switches may interrupt any of the foregoing flowchart such that the system may be turned on/off, such as switch 218.

Figure 15:
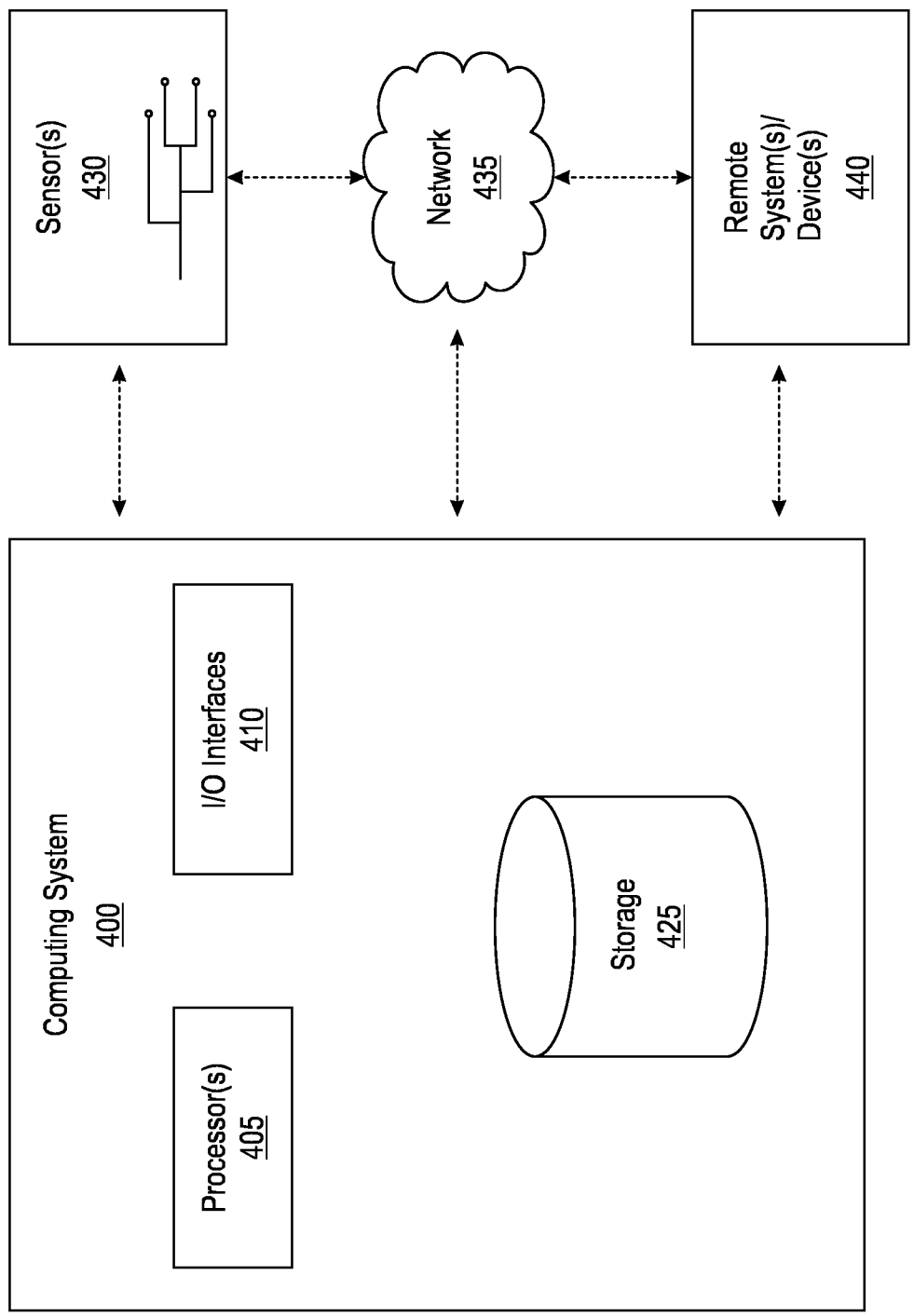
FIG. 15 illustrates a schematic representation of a computing system.

FIG. 15 illustrates a schematic representation of a computing system 400 implemented in the computer-controlled PTO-driven motorized pump system 100, 200, which executes computing system 300. The computing system 400 may take different forms, such as electronic control modules (ECMs), personal computers, desktop computers, laptop computers, tablets, handheld devices (e.g., mobile phones, PDAs, pagers), microprocessor-based or programmable consumer electronics, minicomputers, mainframe computers, multi-processor systems, network PCs, distributed computing systems, datacenters, message centers, routers, switches, and even devices that conventionally have not been considered a computing system, such as wearables (e.g., glasses, head-mounted displays).

As noted, the computing system 400 may also be a distributed system that includes one or more connected computing components/devices that are in communication. Accordingly, the computing system 400 may be embodied in any form and is not limited to any particular embodiment explicitly shown herein.

In its most basic configuration, the computing system 400 includes various components. For example, the computing system 400 includes at least one hardware processing unit 405 (aka a "processor"), input/output (I/O) interfaces 410, and storage 425.

The storage 425 may be physical system memory, which may be volatile, non-volatile, or some combination of the two. The term "memory" may also be used herein to refer to non-volatile mass storage such as physical storage media. If the computing system 400 is distributed, the processing, memory, and/or storage capability may be distributed as well. As used herein, the term "executable module," "executable component," or even "component" can refer to software objects, routines, or methods that may be executed on the computing system 400. The different components, modules, engines, and services described herein may be implemented as objects or processors that execute on the computing system 400 (e.g. as separate threads).

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The disclosed embodiments may comprise or utilize a special-purpose or general-purpose computer including computer hardware, such as, for example, one or more processors (such the hardware processing unit 405, which may include one or more central processing units (CPUs), graphics processing units (GPUs) or other processing units) and system memory (such as storage 425). Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media. Additionally, it will be appreciated the components of the computing system 400 may be combined, such as by using a microcontroller, which combines a processor and memory.

A "network," like the network 435 shown in FIG. 15, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing system 400 will include one or more communication channels that are used to communicate with the network 435. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code.

While not all computing systems require a user interface, in some embodiments, a computing system 400 includes, as part of the I/O interfaces 410, a user interface for use in communicating information to/from a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, controllers, projections, holograms, cameras, keyboards, stylus, mouse, or other pointer input, sensors of any type, and so forth. The computing system 400 may perform certain functions in response to detecting certain user input.

The computing system 400 may also be connected (via a wired or wireless connection) to external sensors 430 (e.g., a temperature sensor associated with the generator, motor, or vacuum pump, a vacuum pump oil reservoir sensor, an RPM sensor, a pressure sensor, or other sensors). It will be appreciated that the external sensors may include sensor systems rather than solely individual sensor apparatuses.

Further, the computing system 400 may also include communication channels allowing the computing system 400 to be in wireless (e.g., Bluetooth®, Wi-Fi®, satellite, infrared, etc.) or wired communication with any number or combination of sensors 430, networks 435, and/or other remote systems/devices 440. Remote systems/devices 440 may be configured to perform any of the processing described with regard to computing system 400. By way of example, a remote system may include an administrative system that defines operation constraints for the computer-controlled PTO-driven motorized pump system 100, 200, receives sensor readings from the sensors 430, and/or issues commands to selectively deactivate the motor/generator that is in communication with the computing system 400.

Those skilled in the art will appreciate that the embodiments may be practiced in network computing environments with many types of computer system configurations. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Additionally, or alternatively, the functionality described herein can be performed, at least in part, by one or more hardware logic components (e.g., the hardware processing unit). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

Having described exemplary components and configurations of a computing system 400, the following describes various functionalities that may be facilitated by the computing system 400 or a remote system/device 440 of a computer-controlled PTO-drive motorized pump system 100, 200 of the present disclosure.

In some embodiments, the computing system 400 includes computer-executable instructions (e.g., stored on storage 425) that enable the computing system 400 (e.g., by one or more processors 405 executing the computer-executable instructions) to selectively activate or deactivate any portion of the motorized pump system, such as the generator, the motor, the vacuum pump, etc. In some instances, the computing system selectively deactivates at least one component of the motorized pump system in response to a triggering event. In some instances, the triggering event is detecting that a sensor reading of one or more sensors 430 has met or exceeded a predetermined threshold value or is outside of a predetermined acceptable range.

For example, the system may selectively deactivate a component of the motorized pump system in response to determining that the oil in the vacuum pump oil reservoir is below an acceptable threshold value. In another example, the system may selectively deactivate a component of the motorized pump system in response to determining that the pump temperature has exceeded a predefined safe operation temperature for the pump. In other instances, the system may selectively deactivate a component of the motorized pump system in response to determining that the RPM of the pump is too high. In yet other instances, the system may selectively deactivate a component of the motorized pump system in response to determining that a predetermined volume of fluid has been pumped/loaded/unloaded by the pump.

In this way, a computer-controlled PTO-driven motorized pump system of the present disclosure may avoid damages caused by driver negligence by allowing for automatic deactivation of the pump system in response to automatically determining that one or more sensor values have reached a level that will cause damage to the pump system if the pump continues to operate (or will cause a spill that will be costly to clean up).

In implementations where the computing system 400 includes or is in communication with a user interface (e.g., whether directly as an I/O interface 410 or as part of a remote system/device 440, such as a mobile device of a semi-truck driver or fleet administrator), the computing system 400 may receive triggering input (e.g., from an I/O interface 410 or a remote system/device 440) that causes the computing system 400 to selectively activate or deactivate one or more components of the motorized pump system (e.g., the motor). For instance, the computing system 400 is activated or deactivated by a remote user (e.g., fleet administration) so as to control the entire system, such as when and how it is activated. Additionally, in some instances, the computing system 400 is activated or deactivated depending on GPS location. For example, if a semi-truck is in the desired load/unload location, then the computing system 400 may be activated. When the semi-truck is not in the desired load/unload location, the computing system 400 may be deactivated.

Figure 16:
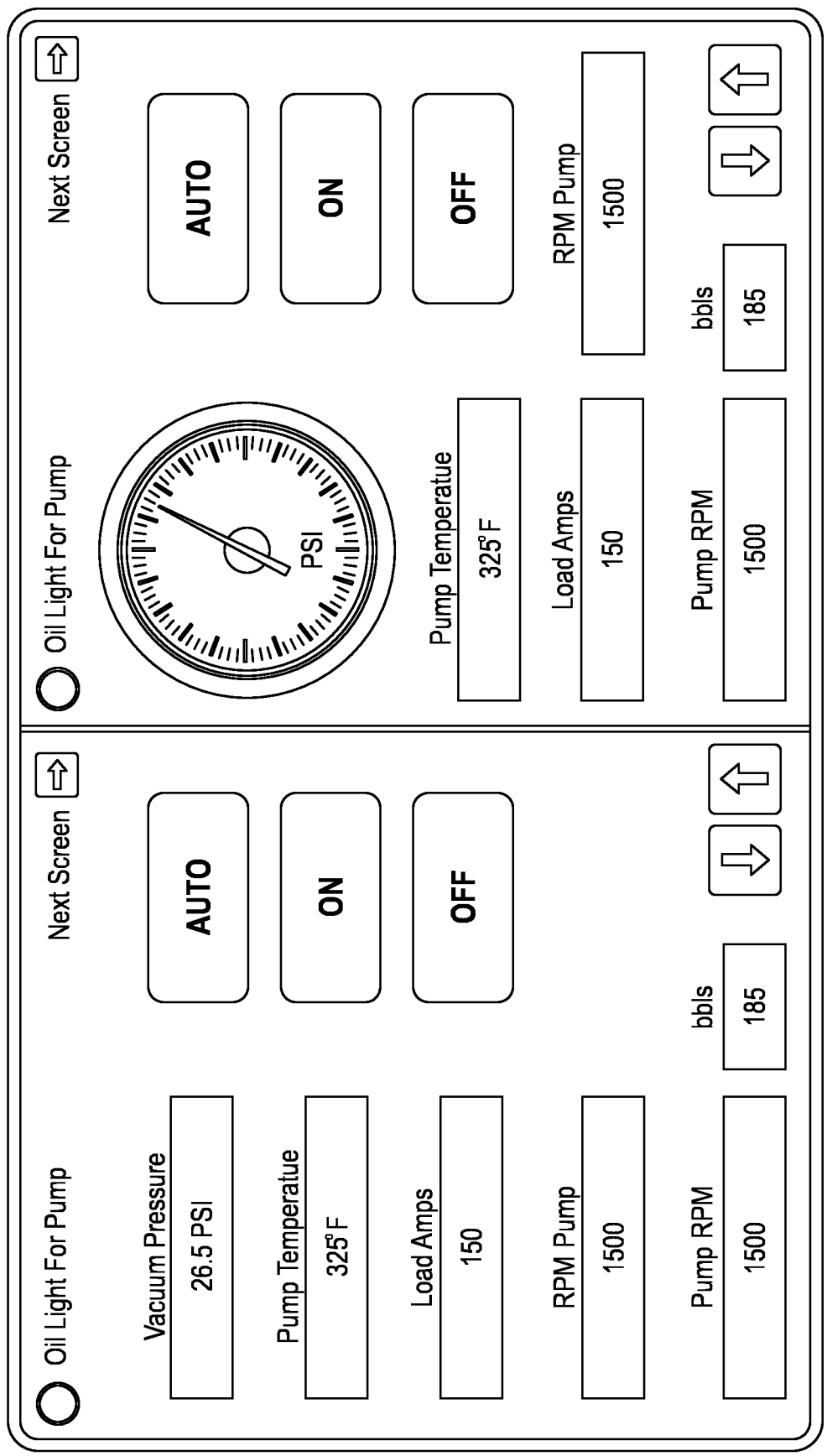
FIG. 16 illustrates an exemplary representation of a user interface of a computing system of a computer-controlled PTO driven motorized pump system.

Furthermore, the computing system 400 may cause sensor values detected by the various sensors 430 in communication with the computing system 400 to be displayed on a user display or user interface (e.g., an I/O interface 410 and/or a display of a remote system/device 440). For example, FIG. 16 shows exemplary sensor readings being displayed on a display of a user/administrator interface associated with the computing system 400. As shown, the computing system 400 causes the display of vacuum pressure, pump temperature, load amps of the motor, RPM of the vacuum pump, a number of barrels loaded/unloaded (or to be loaded/unloaded) by the motorized pump system and various input buttons (i.e., "AUTO", "ON", "OFF") for triggering selective activation/deactivation of the motorized pump system. The computing system 400 also includes a notifier that indicates when the oil level of the vacuum pump oil reservoir has reached an unacceptably low level, according to the applicable sensor reading. Displaying combinations of sensor readings to a user/administrator may make it easier for a user/administrator to ensure that the pump system is operated with due care, so as to avoid damage to the pump system or other damages caused by improper operation thereof.

In some instances, the computing system 400 is configured to provide a notification on a user/administrator interface in response to detecting that a sensor reading of one or more sensors of the computer-controlled motorized pump system has met or exceeded a predetermined threshold value. The notification can take on various forms, such as a visual notification on a screen, a sound, etc.

As is also shown in FIG. 16, in some embodiments, a user/administrator may predefine, with the user interface, a number of barrels to be pumped/loaded/unloaded by the presently disclosed motorized pump system. The user may then press the "AUTO" button to provide input for activating the motorized pump system to pump the predefined amount of fluid. The computing system 400 may then automatically deactivate one or more components of the motorized pump system upon determining that the predetermined number of barrels (or other volume metric) of fluid has been pumped/processed by the motorized pump system. This functionality may reduce the number of costly fluid spills that will occur when transporting fluids in tank trailers with semi-trucks.

Figure 17:
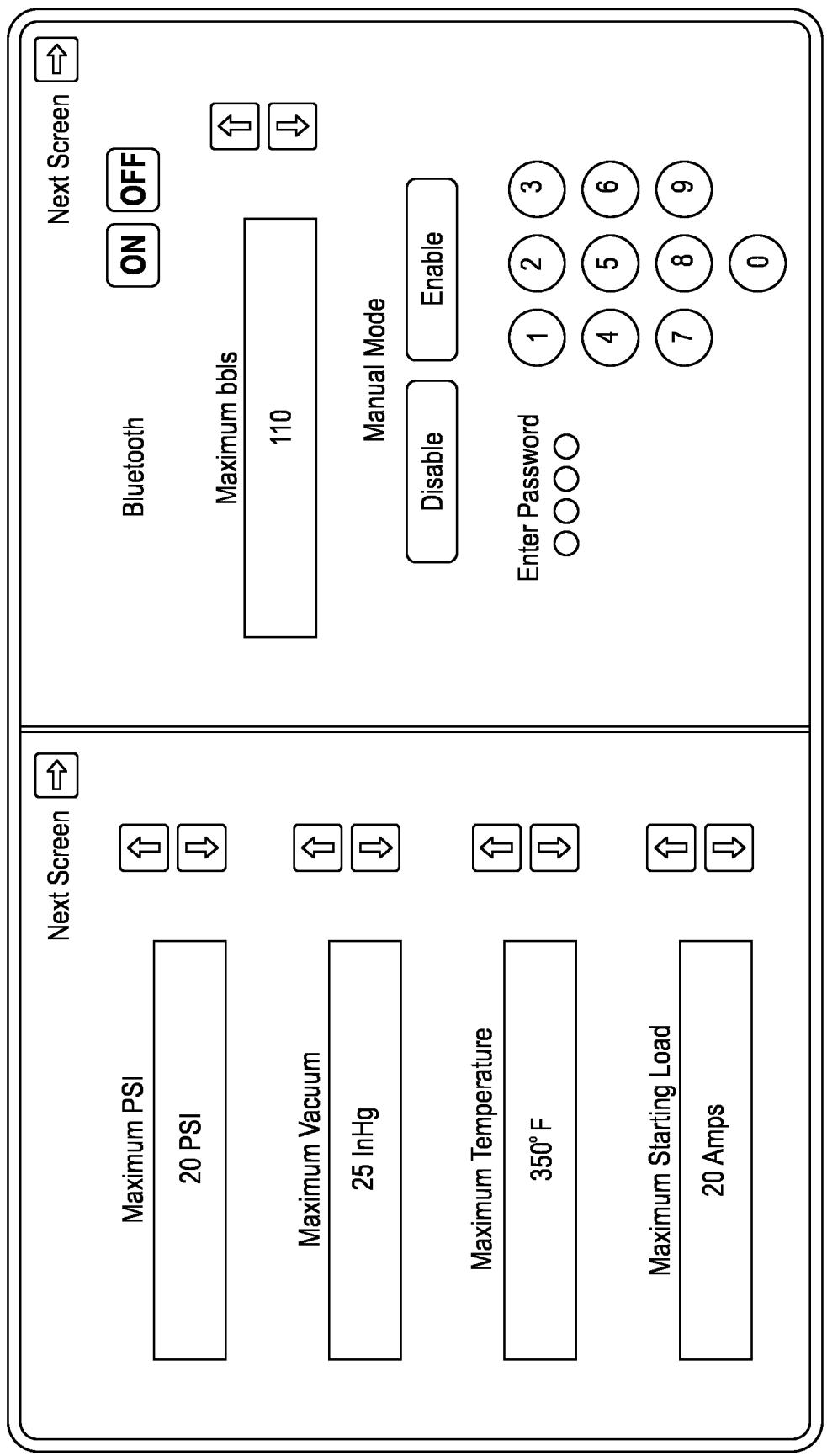
FIG. 17 illustrates an exemplary representation of an administrative computer interface in communication with a computer-controlled PTO driven motorized pump system.

FIG. 17 illustrates an exemplary representation of an administrative computer interface (e.g., of a remote system/device 440) in communication with a computer-controlled PTO driven motorized pump system. In the embodiment shown in FIG. 17, the administrative computer interface includes additional functionality and/or features as compared with the interface shown in FIG. 16. FIG. 17 shows that, in some embodiments, an administrator defines threshold values that may trigger the computing system 400 to selectively deactivate one or more components of the motorized pump system (e.g., the generator or the motor). For instance, the administrator may define a maximum operational pressure for the vacuum pump or tank (e.g., in PSI, inHg, or other units), a maximum operational temperature for the vacuum pump, a maximum starting load for the motor, and/or a maximum pumping volume or weight (e.g., in barrels or other units). Additionally, the administrative controls may allow an administrator to selectively enable and/or disable certain functionality accessible to an on-site user/semi-truck driver user interface. For instance, an administrator may disable wireless operation of the motorized pump system and/or manual activation/deactivation of the motorized pump system. To ensure that only administrators may access administrative controls, administrative controls may include security measures for access/issuing commands, such as passcodes, biometrics, etc.

In this way, freight company administrators and/or fleet commanders may ensure optimal operation of computer-controlled PTO-drive motorized pump systems that extends the economic life of the pump systems.

Figure 18:
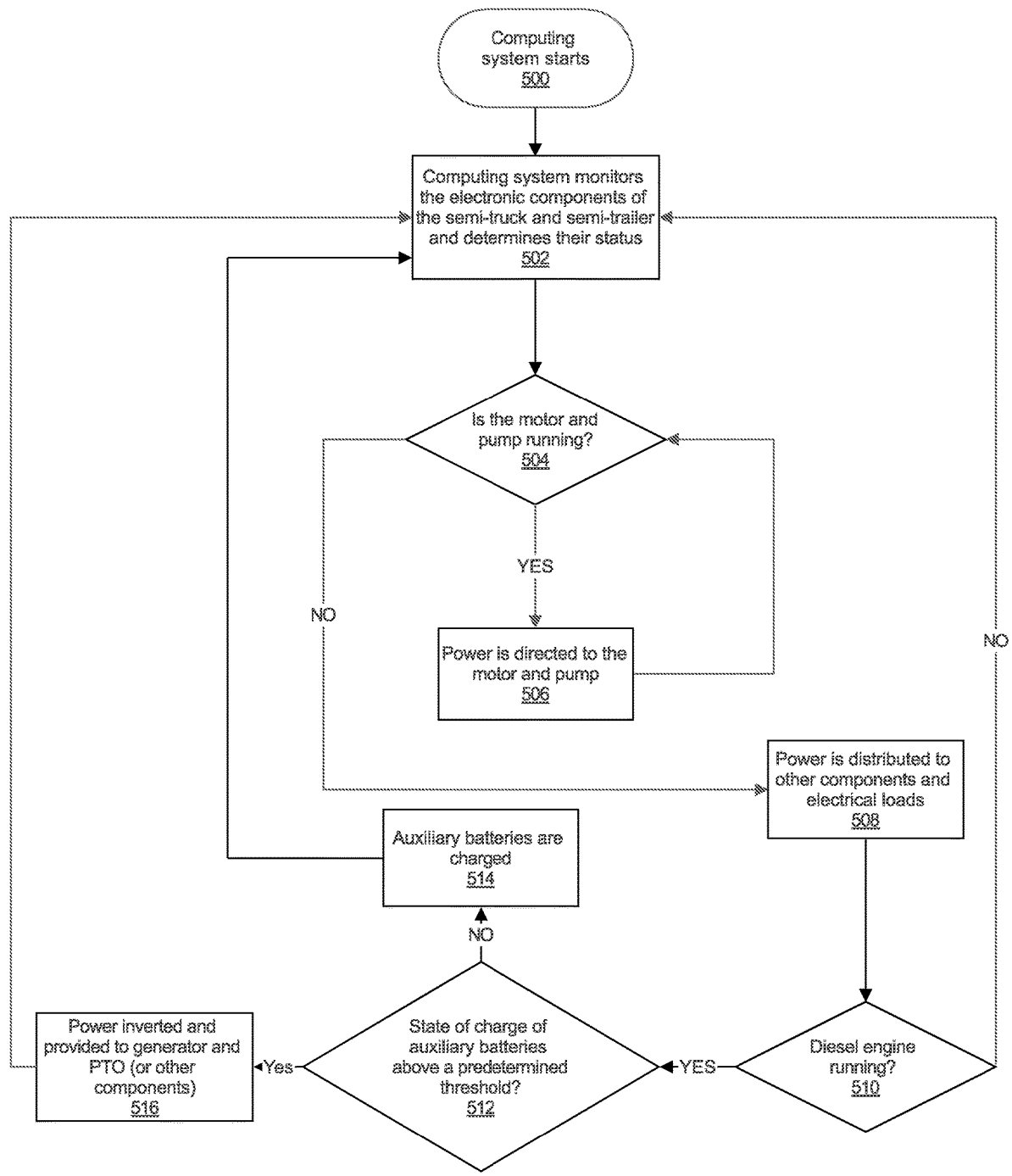
FIG. 18 illustrates a flowchart representation of battery regulation and related monitoring systems of a system for a computer-controlled PTO driven motorized pump system according to some embodiments.

FIG. 18 illustrates a flowchart illustrating the power management capabilities of the computer-controlled power take off (PTO) driven motor system 100. In particular, the computing system starts at step 500 (which may be operational on controller 208, first controller 210, or the ECM controller 220). When the diesel engine is not running, the power to the computing system may be received from a crank battery, an auxiliary battery 209, a solar panel 211, or grid power 213. When the diesel engine is running, power may be supplied from the alternator or from the other components mentioned above. At step 502, the computing system monitors the electronic components of the computer-controlled power take off (PTO) driven motor system 100 as well as the diesel truck to determine their status. At step 504, the computing system determines whether the motor 230 and pump 232 are running (such as by reading current, voltage, or some other indicator). If the motor 230 is running, then at step 506, power is provided to the motor from available sources (e.g., generator 204, auxiliary battery 209, solar panels 211, and/or power grid 213). Likewise, the computing system determines whether the generator 204 is running ate step 508. If the generator 204 is running and the motor 230 is not running, then, at step 506, energy is directed to the one or more auxiliary batteries 209 to charge them. At step 508, if the voltage of the auxiliary batteries 209 is above a predetermined threshold and the motor 230 is not running, then power may be sent from available sources (e.g., auxiliary batteries 209) to other components, such as climate control or other driver conveniences, or back to the PTO 202 through the generator 204, all of which increase fuel economy by reducing the mechanical load on the diesel engine. It will be appreciated that a minimum state of charge threshold may be programmed in the computing system to ensure that the auxiliary batteries 209 are not depleted and may be used for the motor 230 and pump 232 even when the semi-truck engine is not running. For example, a predetermined minimum state of charge may allow sufficient power for the motor 230 and pump 232 to run the average time required to empty the tank 128. Accordingly, at step 510, the system checks if the diesel engine is running. If not running, the process returns to 502 and the cycle continues. If the diesel engine is running, then at step 512 the state of charge of the auxiliary batteries 209 is determined. If the state of charge is not above a predetermined threshold, then, at step 514, power is directed to the auxiliary batteries 209 for charging. If the state of charge of the auxiliary batteries 209 is above a predetermined threshold and the diesel engine is running, then at step 516, power may be directed to the generator 204 and PTO 202 or to other electrical components, such as the climate control system, to thereby increase fuel economy by reducing the mechanical load on the diesel engine.

Unless defined otherwise, all technical and scientific terms used herein have the same meaning as commonly understood by one of ordinary skill in the art to which the present disclosure pertains.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the pended claims. All changes which come within the meaning and range of equivalency of the claims are to be embraced within their scope.

The invention claimed is:

1. A computer-controlled motorized pump system, comprising:
a first controller configured to receive alternating current (AC) power from a generator, the generator configured to be couplable to a power takeoff (PTO), the first controller being operable to convert the AC power to direct current (DC) power and provide DC power to one or more auxiliary batteries, to one or more processors, and to a second controller;

the second controller providing at least a portion of the DC power to one or more processors and inverting another portion of the DC power to AC power and configured to provide the AC power to an electric motor; the electric motor configured to be mechanically coupled to a gear pump or vacuum pump, the gear pump or vacuum pump coupled to a reservoir of a tank of a semi-truck for selectively loading or unloading the reservoir.

2. The computer-controlled motorized pump system of claim 1, wherein the one or more auxiliary batteries are configured to provide power to auxiliary systems of the semi-truck when a state of charge of the one or more auxiliary batteries is above a predetermined threshold.

3. The computer-controlled motorized pump system of claim 1, wherein the one or more auxiliary batteries are configured to provide power to the generator which generates rotational force to the PTO.

4. The computer-controlled motorized pump system of claim 1, wherein the first or second controller is configured to provide a notification on a user interface in response to detecting that a sensor reading of at least one sensor has met or exceeded a predetermined threshold value.

5. The computer-controlled motorized pump system of claim 1, wherein the first or second controller wirelessly communicates with one or more administrative computing systems.

6. The computer-controlled motorized pump system of claim 1, wherein the first or second controller is configured to selectively activate or deactivate the electric motor in response to a triggering event.

7. The computer-controlled motorized pump system of claim 6, wherein the triggering event is receiving user input from a user interface.

8. The computer-controlled motorized pump system of claim 6, wherein the triggering event is receiving input from an administrative computing system that is in communication with the first or second controller.

9. The computer-controlled motorized pump system of claim 6, wherein the triggering event is detecting that a sensor reading of at least one sensor of the computer-controlled motorized pump system has met or exceeded a predetermined threshold value.

10. The computer-controlled motorized pump system of claim 6, wherein the triggering event is determining that a predetermined volume of fluid has been pumped.

11. A computer-controlled motorized pump system implemented on a semi-truck for selectively loading and unloading a tank, comprising:

a first controller configured to receive alternating current (AC) power from a generator on the semi-truck, the first controller coupled to one or more switches, the first controller:
  i. providing at least a portion of direct current (DC) power to an electronic control module (ECM) and at least one auxiliary battery, and
  ii. inverting another portion of the DC power to AC power and providing the AC power to one or more of:
    a. an electric motor, and
    b. semi-truck auxiliary systems;

the ECM coupled to one or more sensors; and the electric motor configured to mechanically couple to a gear pump or vacuum pump, the gear pump or vacuum pump coupled to the tank of the semi-truck to selectively load or unload the tank;

wherein the ECM sends signals, based upon a status of the one or more sensors, to the first controller, the first controller controlling the electric motor based upon a status of the one or more switches and the signals received from the ECM, and wherein the at least one auxiliary battery is configured to power the auxiliary systems of the semi-truck when the one or more sensors detect that a state of charge of the one or more auxiliary batteries exceeds a predetermined threshold value.

12. The computer-controlled motorized pump system of claim 11, wherein the one or more sensors comprise a pressure sensor.

13. The computer-controlled motorized pump system of claim 11, wherein the one or more sensors comprise a temperature sensor coupled to the electric motor, a voltage sensor coupled to the electric motor, and a pressure sensor coupled to the vacuum pump.

14. The computer-controlled motorized pump system of claim 11, further comprising a cooling system configured to operate in fluid communication with the electric motor.

15. A method of using a computer-controlled motorized pump system to selectively load or unload a tank of a semi-truck, comprising:

providing direct-current (DC) power from a power takeoff (PTO) connected generator to a first controller;

providing at least a portion of the DC power from the first controller to at least one auxiliary battery and an electronic control module (ECM), the ECM communicating with one or more sensors and controlling an electric motor and either a gear pump or vacuum pump, via the first controller, based-upon signals received from the one or more sensors;

inverting at least a portion of the DC power to provide alternating current (AC) power to the motor coupled to the gear pump or vacuum pump;

selectively loading or unloading the tank of the semi-truck via the gear pump or vacuum pump; and distributing power from the at least one auxiliary battery to the motor, to auxiliary systems of the semi-truck, or to the generator based on predetermined parameters.

16. The method of claim 15, wherein the auxiliary systems of the semi-truck include climate control.

17. The method of claim 15, wherein when power is provided to the generator from the one or more batteries, the generator generates a rotational force to the PTO.

18. The method of claim 15, wherein the first controller receives power from one or more of:
a. the generator,
b. a solar panel, or
c. grid power.

* * * * *